(12) United States Patent
Takahashi

(10) Patent No.: US 7,161,884 B2
(45) Date of Patent: Jan. 9, 2007

(54) INFORMATION DISC RECORDING/PLAYBACK APPARATUS AND METHOD FOR COUNTING PULSES AND CONTROLLING A ROTATION SPEED OF AN INFORMATION DISC

(75) Inventor: Yorio Takahashi, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/249,309

(22) Filed: Oct. 14, 2005

(65) Prior Publication Data

US 2006/0028941 A1 Feb. 9, 2006

Related U.S. Application Data

(62) Division of application No. 10/148,808, filed as application No. PCT/JP01/09934 on Nov. 14, 2001, now abandoned.

(30) Foreign Application Priority Data

Jan. 24, 2001 (JP) ............................. 2001-15366

(51) Int. Cl.
G11B 7/00 (2006.01)
(52) U.S. Cl. .................................. 369/53.2; 369/47.36
(58) Field of Classification Search ............... 369/53.2, 369/47.36; G11B 7/00, 7/085
See application file for complete search history.

(56) References Cited

U.S. PATENT DOCUMENTS

| 4,866,687 A * | 9/1989 | Kasai et al. ............. 369/30.15 |
| 5,199,017 A | 3/1993 | Kagami et al. |
| 5,249,213 A * | 9/1993 | Kobunaya .................... 377/39 |
| 5,539,711 A | 7/1996 | Mitani |
| 5,623,461 A | 4/1997 | Sohmuta |
| 5,844,866 A | 12/1998 | Fujimoto et al. |
| 5,982,728 A | 11/1999 | Okamoto et al. |
| 6,181,652 B1 | 1/2001 | Katou et al. |
| 6,894,957 B1 | 5/2005 | Shimada |
| 6,958,964 B1 | 10/2005 | Koh |

FOREIGN PATENT DOCUMENTS

| JP | 5-266498 | 10/1993 |
| JP | 6-76315 | 3/1994 |
| JP | 09-167354 | * 6/1997 |
| JP | 11-339278 | 5/1998 |

(Continued)

OTHER PUBLICATIONS

MAT (machine assited translaiton of) JP 09-167354.*

Primary Examiner—A M Psitos
(74) Attorney, Agent, or Firm—Wenderoth, Lind & Ponack, L.L.P.

(57) ABSTRACT

The present invention provides an information disc recording/playback apparatus which includes a track cross detection means, a track cross direction detection means, a rotation angle detection means, and a count means, detects the track pitch of a disc, evaluates the vibration amount, vibration speed, or vibration acceleration considering the track pitch of the disc, and determines a maximum rotation speed that is lower than the allowable vibration amplitude, vibration speed, or vibration acceleration of the information disc recording/playback apparatus. The present invention also provides a vibration detection method for the information disc recording/playback apparatus. This information disc recording/playback apparatus can perform vibration detection using a single threshold value that is independent of the type of the disc, without using an acceleration sensor, and further, the apparatus can accurately perform vibration detection even when direction detection is difficult.

8 Claims, 10 Drawing Sheets

FOREIGN PATENT DOCUMENTS

| | | |
|---|---|---|
| JP | 10-302384 | 11/1998 |
| JP | 11-126419 | 5/1999 |
| JP | 2000-113581 | 4/2000 |
| JP | 2000-306-246 | 11/2000 |

* cited by examiner ered and outputting rotation angle information to the measurement unit 907.

INFORMATION DISC RECORDING/PLAYBACK APPARATUS AND METHOD FOR COUNTING PULSES AND CONTROLLING A ROTATION SPEED OF AN INFORMATION DISC

This is a divisional of U.S. application Ser. No. 10/148,808, filed Oct. 4, 2002, now abandoned which is a National Stage Application of International Application No. PCT/JP01/09934, filed Nov. 14, 2001.

TECHNICAL FIELD

The present invention relates to an information disc recording/playback apparatus having a vibration measurement means for measuring vibrations caused by an eccentricity of a disc, and a vibration detection method for the information disc recording/playback apparatus. More particularly, the present invention relates to an information disc recording/playback apparatus having a construction for performing vibration detection by using track counting.

BACKGROUND ART

In recent years, optical disc playback apparatuses have made a remarkable increase in recording/playback speed. The optical disc playback apparatuses have achieved the increase in the playback speed by increasing the rotation speed of optical discs.

However, when the rotation speed of an optical disc is increased, vibration due to an eccentricity of the optical disc adversely affects control such as servo, resulting in a problem that the user of the optical disc playback apparatus might feel uncomfortable. In view of such a problem, when an optical disc having a large eccentricity is loaded on the optical disc playback apparatus, the optical disc playback apparatus limits the rotation speed of the disc to prevent the adverse effect of vibration due to the disc having the large eccentricity. Therefore, the measurement of vibration amplitudes is an important technique for preventing the adverse effect of vibration due to the disc having the large eccentricity in the optical disc playback apparatus.

FIG. 8 is a block diagram illustrating a conventional optical disc playback apparatus 800 having a structure for detecting vibration with an acceleration sensor. In FIG. 8, reference numeral 801 denotes a base, reference numeral 802 denotes a disc motor mounted on the base 801, reference numeral 803 denotes an insulator supporting the base 801, reference numeral 804 denotes a disc mounted on the disc motor 802, reference numeral 805 denotes an acceleration sensor mounted on the base 801, and reference numeral 806 denotes a measurement unit for measuring the amount of eccentricity on the basis of the output of the acceleration sensor 805.

Hereinafter, the operation of the conventional optical disc playback apparatus 800 will be described. When the disc motor 802 on which the disc 804 is mounted is rotated at a predetermined rpm (revolutions per minute), a centrifugal force in proportion to the amount of eccentricity of the disc 804 is generated. The base 801 supported by the insulator 803 vibrates at an amplitude that is determined by the amount of eccentricity of the disc 804, the total mass of the base 801 and the constituents mounted on the base 801, and the spring constant of the insulator 803.

The vibration of the base 801 is converted into an electric signal by the acceleration sensor 805 mounted on the base 801. The measurement unit 806 measures the vibration amplitude of the base 801 on the basis of the electric signal obtained by the acceleration sensor 805.

Then, the measured vibration amplitude is compared with a preset threshold value, thereby determining a maximum rotation speed of the disc mounted on the optical disc device.

Furthermore, FIG. 9 is a block diagram illustrating a conventional optical disc playback apparatus 900 performing vibration detection by using track counting, which is disclosed in Japanese Published Patent Application No. 2000-113581. In FIG. 9, the same reference numerals as those shown in FIG. 8 denote the same or corresponding parts, and reference numeral 901 denotes an optical head which is suspended over the base 801 via an elastic member 902.

Reference numeral 903 denotes a light beam applied to the disc 804 from the optical head 901, and reference numeral 904 denotes information recording tracks which are concentrically or spirally formed on an information recording surface 804A of the disc 804 at a constant pitch. Furthermore, reference numeral 905 denotes a track cross detection unit for generating track cross pulses and a cross direction signal from signals which are reproduced when the light beam 903 crosses the information recording tracks 904; reference numeral 906 denotes a count unit for counting the track cross pulses; reference numeral 907 denotes a measurement unit for determining the amount of eccentricity from the counting result of the count unit 906; and reference numeral 908 denotes a motor control unit for controlling the rpm of the disc motor 802, and outputting rotation angle information to the measurement unit 907.

The distance between the optical head 901 and the disc 804 is kept constant so that the focus of the light beam 903 is positioned on the information recording surface 804A of the disc 804. The position of the optical head 901 relative to the disc 804 in the direction of the radius of the disc 804 (the direction indicated by an arrow R) has vibration characteristics represented by a natural frequency of vibration foA which is determined by the spring constant of the elastic member 902 comprising a material such as metal, resin, or rubber, and the mass of the optical head 901.

The base 801 is supported by the insulator 803 comprising a material such as metal, resin, or rubber. When the centrifugal force generated by the rotation of the disc 804 is propagated through the disc motor 802 to the base 801, the base 801 vibrates on the basis of vibration characteristics represented by a natural frequency of vibration foM which is determined by the total mass of the constituents including the base 801, the optical head 901 mounted on the base 801, the disc motor 802, and the disc 804, and the spring constant of the insulator 803.

The motor control unit 908 rotates the disc motor 802 at a first rpm that is sufficiently lower than the natural frequency of vibration foA. The optical disc 804 mounted on the disc motor 802 is rotated at the first rpm.

Within the range of the first rpm that is sufficiently lower than the natural frequency of vibration foA, the optical head 901 vibrates together with the base 801. The relative position between the optical head 901 and the optical disc 804 hardly changes. Therefore, at the first rpm that is sufficiently lower than the natural frequency of vibration foA, the light beam 903 crosses a number of information recording tracks 904 equivalent to the amount of eccentricity of the information recording tracks 904. The light beam 903 generates as many track crosses as the information recording tracks 904 that the light beam 903 has crossed.

Then, the track cross detection unit 905 detects the track crosses corresponding to the information recording tracks 904 the light beam 903 has crossed, on the basis of the playback signals of the optical head 901, and generates track cross pulses corresponding to the detected track crosses. The track cross detection unit 905 outputs the generated track cross pulses to the count unit 906.

The count unit 906 counts the track cross pulses for one rotation of the disc 804 on the basis of the rotation angle information from the motor control unit 908. The measurement unit 907 stores a count result N1 of the track cross pulses for one rotation of the disc 804 which are counted by the count unit 906.

Next, the motor control unit 908 rotates the disc motor 802 at a second rpm that is higher than the natural frequency of vibration foA and lower than the natural frequency of vibration foM. Then, a centrifugal force is generated in the disc 804 due to the eccentricity of the disc 804. The base 801 vibrates at an amplitude that is determined by the amount of eccentricity of the disc 804, the total mass of the base 801 and the components mounted on the base 801, and the spring constant of the insulator 803.

When the disc motor 802 rotates at the second rpm that is higher than the natural frequency of vibration foA and lower than the natural frequency of vibration foM, only the base 801, disc motor 802, and disc 804 vibrate together while the optical head 901 is in the static state. Therefore, the relative displacement between the disc 804 and the optical head 901 becomes equal to the vibration displacement of the base 801. As a result, the light beam 903 generates as many track crosses as the tracks equivalent to an amount in which the vibration amplitude of the base 801 is added to the amount of eccentricity of the information recording tracks 904.

The track cross detection unit 905 detects the track crosses which number as many as the tracks equivalent to the amount comprising the amount of eccentricity of the information recording tracks 904 and the vibration amplitude of the base 801, and generates as many track cross pulses as the tracks equivalent to the amount comprising the amount of eccentricity of the information recording tracks 904 and the vibration amplitude of the base 801. The track cross detection unit 905 outputs the generated track cross pulses to the count unit 906.

The count unit 906 counts the track cross pulses for one rotation of the disc 804, on the basis of the rotation angle information from the motor control unit 908. The measurement unit 907 subtracts the count result N1 from a count result N2 obtained by the count unit 906, thereby obtaining the vibration amplitude of the base 801 alone.

Then, the measured vibration amplitude is compared with a threshold value which is prepared for each disc type, thereby determining a maximum rotation speed of the disc loaded on the optical disc device.

Furthermore, when detecting a vibration amplitude by a track counting method, setting of a track count filter according to the vibration speed becomes important for preventing a false count. Although a method of setting a track count filter for vibration detection is not general at present, a method disclosed in Japanese Published Patent Application No. Hei. 8-45089 is known as a method of setting a track count filter at seeking. To be specific, an optical disc device disclosed is provided with a PLL circuit for outputting a control frequency according to the moving speed of an optical head when the optical head is moved to a target track position on the surface of an optical disc by a thread motor; an F/V conversion circuit for converting the control frequency into a voltage; and a ripple detection filter for attenuating a noise component included in a ripple signal from an envelope detection circuit, whose filter characteristic is changed according to the voltage from the F/V conversion circuit. Thereby, the cut-off frequency of the filter is varied according to the moving speed of the optical head.

In the above-mentioned conventional method for detecting vibration by using the acceleration sensor 805, since the vibration itself of the disc device is measured by using the acceleration sensor, a maximum rotation speed can be determined by comparing the measurement result with a single threshold value that is independent of the disc type. However, an increase in cost due to mounting of the acceleration sensor 805 and a signal amplifier for amplifying the signal from the acceleration sensor 805 is considerable. Furthermore, it is necessary to secure a space for mounting the acceleration sensor 805 and the signal amplifier.

Furthermore, in the conventional method for detecting vibration using track counting, which is disclosed in Japanese Published Patent Application No. 2000-113581, the measurement of vibration amplitudes can be carried out with reduced cost and space, without using an acceleration sensor. However, since track counting is employed, if the track pitch of the disc varies, the value of the measured vibration amplitude also varies even under the same vibration condition, and therefore, a threshold value must be prepared for each disc having different track pitches, and a maximum rotation speed is determined by comparing each threshold value. However, the vibration of the disc device varies depending on the setting condition of the disc device on a system, and moreover, the vibration amplitude with which the user feels uncomfortable depends on the human sense and so it varies depend on the user. Therefore, a threshold value must be set for each system on which the disc device is to be mounted. However, since threshold setting varies depending on the loading condition or the like of the disc to be used on the disc device, a large amount of data must be measured, and the amount of data further increases according to the number of disc types, whereby an enormous amount of time is required to measure such data.

Furthermore, in the method of setting a track count filter disclosed in Japanese Published Patent Application No. Hei. 8-45089, when performing a traverse seek, how the seek speed will change is known in advance because acceleration or deceleration of the seek speed is carried out according to a speed profile that has previously been determined, and the response speed to the change in the filter characteristics can be appropriately set according to the predetermined profile. However, in the case where the frequency and the speed change in the frequency are changed considerably due to the eccentricity of the disc or the vibration amplitude like the track count pulses for vibration detection, it is difficult to set the response speed to the change in the filter characteristics, resulting in false count when the response speed is too high or too low.

The present invention is made to solve the above-described problems. Therefore, an object of the present invention is to provide an information disc recording/playback apparatus and a vibration detection method for the information disc recording/playback apparatus, which can measure vibration amplitudes with reduced cost and space without using an acceleration sensor, perform vibration detection by using a single threshold value that is independent of the disc type, and perform accurate vibration detection even when direction detection is difficult.

Another object of the present invention is to provide an information disc recording/playback apparatus and a vibration detection method for the information disc recording/playback apparatus, which can provide a method of controlling the cut-off frequency of a noise removal filter for track counting that is most suited to vibration detection, and perform accurate vibration detection with less of a false count.

SUMMARY OF THE INVENTION

According to a first aspect of the present invention, an information disc recording/playback apparatus is provided that is capable of recording or playing at least two kinds of information discs having different track pitches, on which information recording tracks are formed spirally or concentrically. The apparatus comprises: a disc rotation means for rotating the information disc at a predetermined speed; a reading means for reading an information signal from the disc; a drive means for driving the reading means in the direction of the radius of the disc; a track pitch detection means for detecting the track pitch of the information disc from the information disc; a track cross detection means for generating track cross signals on the basis of playback signals that are generated when the reading means crosses the information tracks; a count means for counting track cross pulses that are detected by the track cross detection means, and outputting the count; and a control means for determining a maximum rotation speed that is lower than an allowable vibration amplitude of the information disc recording/playback apparatus on the basis of the count and the track pitch, or determining a maximum rotation speed that is lower than an allowable vibration speed or vibration acceleration speed of the information disc recording/playback apparatus on the basis of the count, the track pitch, and the current disc rotation speed, and controlling the disc rotation means so that the disc rotation means rotates the information disc at a speed lower than the allowable maximum rotation speed to record or reproduce data in/from the disc.

According to a second aspect of the present invention, the information disc recording/playback apparatus of the first aspect further comprises: a track cross direction detection means for detecting a track cross direction indicating the direction in which the reading means crosses the information tracks; and a rotation angle detection means for outputting rotation angle information of the disc rotation means. Further, the count means counts the track cross pulses with signs, which are detected by the track cross detection means, on the basis of the result of the detection by the track cross direction detection means, and the rotation angle information outputted from the rotation angle detection means.

According to a third aspect of the present invention, the information disc recording/playback apparatus of the first aspect further comprises: a track cross direction detection means for detecting a track cross direction indicating the direction in which the reading means crosses the information tracks; a track cross speed detection means for detecting the frequency of the track cross pulses; and a rotation angle detection means for outputting rotation angle information of the disc rotation means. Further, the count means counts the track cross pulses with signs, which are detected by the track cross detection means, on the basis of the result of the detection by the track cross direction detection means and the rotation angle information outputted from the rotation angle detection means, while detecting the track cross direction by the track cross direction detection means when the result of the detection by the track cross speed detection means indicates that the track cross speed is lower than a predetermined value, and counts the track cross pulses with signs, without detecting the track cross direction by the track cross direction detection means, on the basis of the track cross direction that has just previously been detected by the track cross direction detection means, when the result of the detection by the track cross speed detection means indicates that the track cross speed becomes higher than the predetermined value.

According to a fourth aspect of the present invention, an information disc recording/playback apparatus is provided that is capable of recording or playing at least two kinds of information discs having different track pitches, on which information recording tracks are formed spirally or concentrically. The apparatus comprises: a disc rotation means for rotating the information disc at a predetermined speed; a reading means for reading an information signal from the disc; a drive means for driving the reading means in the direction of the radius of the disc; a track pitch detection means for detecting the track pitch of the information disc from the information disc; a track cross detection means for generating track cross signals on the basis of playback signals that are generated when the reading means crosses the information tracks; a track cross direction detection means for detecting a track cross direction indicating the direction in which the reading means crosses the information tracks; a rotation angle detection means for outputting rotation angle information of the disc rotation means, which is divided into n areas for one rotation; a zero cross area detection means for detecting two areas where the track cross speed has a lowest value, from among the n areas; a count means for counting track cross pulses with signs, which are detected by the track cross detection means, on the basis of the result of the detection by the track cross direction detection means and the rotation angle information outputted from the rotation angle detection means, while detecting the track cross direction by the track cross direction detection means, in an area where the track cross speed has the lowest value according to the result of the detection by the zero cross area detection means, counting the track cross pulses with signs, without detecting the track cross direction by the track cross direction detection means, on the basis of the track cross direction that has just previously been detected by the track cross direction detection means, in an area where the track cross speed does not have the lowest value according to the result of the detection by the zero cross area detection means, and outputting the count; and a control means for determining a maximum rotation speed that is lower than an allowable vibration amplitude of the information disc recording/playback apparatus on the basis of the count and the track pitch, or determining a maximum rotation speed that is lower than an allowable vibration speed or vibration acceleration speed of the information disc recording/playback apparatus on the basis of the count, the track pitch, and the current disc rotation speed, and controlling the disc rotation means so that the disc rotation means rotates the information disc at a speed lower than the allowable maximum rotation speed to record or reproduce data in/from the disc.

According to a fifth aspect of the present invention, an information disc recording/playback apparatus is provided that is capable of recording or playing at least two kinds of information discs having different track pitches, on which information recording tracks are formed spirally or concentrically. The apparatus comprises: a disc rotation means for rotating the information disc at a predetermined speed; a reading means for reading an information signal from the disc; a drive means for driving the reading means in the direction of the radius of the disc; a track pitch detection means for detecting the track pitch of the information disc from the information disc; a track cross detection means for generating track cross signals on the basis of playback signals that are generated when the reading means crosses the information tracks; a track cross direction detection means for detecting a track cross direction indicating the direction in which the reading means crosses the information tracks; a rotation angle detection means for outputting rotation angle information of the disc rotation means, which is divided into n areas for one rotation; and a zero cross area detection means for detecting two areas where the track cross speed has a lowest value, from among the n areas. The apparatus also comprises a count means including a first count means for counting track cross pulses with signs, which are detected by the track cross detection means, on the basis of the result of the detection by the track cross direction detection means and the rotation angle information outputted from the rotation angle detection means, and a second count means for counting the track cross pulses detected by the track cross detection means, without detecting the track cross direction, on the basis of the rotation angle information outputted from the rotation angle detection means. The count means obtains a first count of the first count means when the drive means is disabled and the information disc loaded on the disc rotation means is rotated, obtains a second count in which a sign is added to the count of the second count means, on the basis of the track cross direction which has just previously been detected by the track cross direction detection means, when the drive means is disabled and the information disc loaded on the disc rotation means is rotated, selects the first count in an area where the track cross speed has the lowest value according to the result of the detection by the zero cross area detection means, selects the second count in an area where the track cross speed does not have the lowest value according to the result of the detection by the zero cross area detection means, and counts the track cross pulses for every rotation angle and outputting the count. Further, the apparatus comprises and a control means for determining a maximum rotation speed that is lower than an allowable vibration amplitude of the information disc recording/playback apparatus on the basis of the counts and the track pitch, or determining a maximum rotation speed that is lower than an allowable vibration speed or vibration acceleration speed of the information disc recording/playback apparatus on the basis of the counts, the track pitch, and the current disc rotation speed, and controlling the disc rotation means so that the disc rotation means rotates the information disc at a speed lower than the allowable maximum rotation speed to record or reproduce data in/from the disc.

According to a sixth aspect of the present invention, in accordance with the information disc recording/playback apparatus of the fourth or fifth aspects, the rotation angle detection means divides the rotation angle information of the disc rotation means into six areas for each rotation, and outputs the divided information. Further, the zero cross area detection means detects, as zero cross areas, an area where the count of the count means has the smallest value, and an area on a diagonal line with respect to the area.

According to a seventh aspect of the present invention, an information disc recording/playback apparatus is provided that is capable of recording or playing at least two kinds of information discs having different track pitches, on which information recording tracks are formed spirally or concentrically. The apparatus comprises: a disc rotation means for rotating the information disc at a predetermined speed; a reading means for reading an information signal from the disc; a drive means for driving the reading means in the direction of the radius of the disc; a track pitch detection means for detecting the track pitch of the information disc from the information disc; a track cross detection means for generating track cross signals on the basis of playback signals that are generated when the reading means crosses the information tracks; and a count means for counting track cross pulses that are detected by the track cross detection means, and outputting the count. The apparatus also comprises a control means for using, as the count, a difference between the track cross count that is obtained when the information disc is rotated at a first rotation speed and at least one rotation speed that is higher than the first rotation speed, and a count that is measured with the at least one rotation speed higher than the first rotation speed, determining a maximum rotation speed that is lower than an allowable vibration amplitude of the information disc recording/playback apparatus on the basis of the count and the track pitch, or determining a maximum rotation speed that is lower than an allowable vibration speed or vibration acceleration speed of the information disc recording/playback apparatus on the basis of the count, the track pitch and the current disc rotation speed, and controlling the disc rotation means so that the disc rotation means rotates the information disc at a speed lower than the allowable maximum rotation speed to record or reproduce data in/from the disc.

According to an eighth aspect of the present invention, in accordance with the information disc recording/playback apparatus of the seventh aspect, the first rotation speed is a sufficiently low speed at which no vibration occurs between the information disc and the reading means, and the track cross pulses due to the eccentricities of the information disc and the disc rotation means are counted.

According to a ninth aspect of the present invention, in accordance with the information disc recording/playback apparatus of the seventh aspect, the count means counts the track cross pulses at the first rotation speed for a predetermined number of times, and counts the track cross pulses with the at least one rotation speed that is higher than the first rotation speed, for the predetermined number of times. Further, the control means employs, as the count, an average of counts for more than one time, which are selected from among the counts obtained by the above-described repetition, or a value in proportion to the average.

According to a tenth aspect of the present invention, in accordance with the information disc recording/playback apparatus of the seventh aspect, the rotation angle detection means outputs the rotation angle information of the disc rotation means, which is divided into six areas for one rotation, and when a difference between the track cross count measured at the first rotation speed with each of the six-divided rotation angles, and the track cross count which is measured with the at least one rotation speed higher than the first rotation speed is as follows: DAT[n]=DAT[0],DAT[1],DAT[2],DAT[3],DAT[4],DAT[5] (when n>5, n=n mod 6 (a remainder of n being divided by 6), the control means determines a maximum rotation speed that is lower than the allowable amplitude of the information disc recording/playback apparatus, on the basis of a value in proportion to a vibration amount 1 or a vibration amount 2, or a value in proportion to the second power of the vibration amount 1 or the second power of the vibration amount 2, and the track pitch, the vibration amounts 1 and 2 being represented as follows:

$$\text{vibration amount } 1[n] = \frac{2}{\sqrt{3}} \sqrt{\left| \begin{array}{c} DAT[n]^2 + DAT[n]DAT \\ {}[n+1] + DAT[n+1]^2 \end{array} \right|} \qquad \text{(Formula 12)}$$

$$\text{vibration amount } 2[n] = \frac{2}{\sqrt{3}} \sqrt{\left| \begin{array}{c} DAT[n]^2 - DAT[n]DAT \\ {}[n+2] + DAT[n+2]^2 \end{array} \right|} \qquad \text{(Formula 13)}$$

According to an eleventh aspect of the present invention, in accordance with the information disc recording/playback apparatus of the tenth aspect, the control means determines a maximum rotation speed that is lower than the allowable amplitude of the information disc recording/playback apparatus, on the basis of a value in proportion to an average of twelve vibration amounts 1 or vibration amounts 2 which are calculated for n=0–5 according to (Formula 12) or (Formula 13), and the track pitch, or a value in proportion to an average of m pieces of central values selected from among the twelve vibration amounts 1 or vibration amounts 2, and the track pitch, or a value in proportion to an average of m pieces of central values selected from the second powers of the twelve vibration amounts 1 or vibration amounts 2, and the track pitch.

According to a twelfth aspect of the present invention, in accordance with the information disc recording/playback apparatus of the seventh aspect, the rotation angle detection means divides the rotation angle information of the disc rotation means into six areas for one rotation, and outputs the divided rotation angle information. When a difference between the track cross count which is obtained at the first rotation speed for each of the six-divided rotation angles, and the track cross count which is obtained with the at least one rotation speed higher than the first rotation speed is represented by DAT[n]=DAT[0],DAT[1],DAT[2],DAT[3],DAT[4],DAT[5] (when n>5, n=n mod 6 (a remainder of n being divided by 6), and the rotation speed of the disc rotation means is Vrpm[rpm], the control means determines a maximum rotation speed that is lower than the allowable amplitude of the information disc recording/playback apparatus, on the basis of a value in proportion to a vibration speed 1 or a vibration speed 2, or a value in proportion to the second power of the vibration speed 1 or the second power of the vibration speed 2, and the track pitch, the vibration speeds 1 and 2 being represented by $$\text{vibration speed } 1[n] = \frac{2\pi V_{rpm}}{60} \frac{2}{\sqrt{3}} \qquad \text{(Formula 14)}$$

$$\sqrt{\left| \begin{array}{c} DAT[n]^2 + DAT[n]DAT \\ {}[n+1] + DAT[n+1]^2 \end{array} \right|}$$

$$\text{vibration speed } 2[n] = \frac{2\pi V_{rpm}}{60} \frac{2}{\sqrt{3}} \qquad \text{(Formula 15)}$$

$$\sqrt{\left| \begin{array}{c} DAT[n]^2 - DAT[n]DAT \\ {}[n+2] + DAT[n+2]^2 \end{array} \right|}$$

According to a thirteenth aspect of the present invention, in accordance with the information disc recording/playback apparatus of the twelfth aspect, the control means determines a maximum rotation speed that is lower than the allowable amplitude of the information disc recording/playback apparatus, on the basis of a value in proportion to an average of twelve vibration speeds 1 or vibration speeds 2 which are calculated for n=0–5 according to (Formula 14) and (Formula 15), respectively, and the track pitch, or a value in proportion to an average of m pieces of central values selected from the values of the twelve vibration speeds 1 or vibration speeds 2, and the track pitch, or a value in proportion to an average of m pieces of central values selected from the second powers of the twelve vibration speeds 1 or the second powers of the vibration speeds 2, and the track pitch.

According to a fourteenth aspect of the present invention, in accordance with the information disc recording/playback apparatus of the seventh aspect, the rotation angle detection means divides the rotation angle information of the disc rotation means into six areas for one rotation, and outputs the divided rotation angle information. When a difference between the track cross amount which is measured at the first rotation speed for each of the six-divided rotation angles, and the track cross amount which is measured with the at least one rotation speed higher than the first rotation speed is represented by DAT[n]=DAT[0],DAT[1],DAT[2],DAT[3],DAT[4],DAT[5] (when n>5, n=n mod 6 (a remainder of n being divided by 6), and the rotation speed of the disc rotation means is Vrpm[rpm], the control means determines a maximum rotation speed that is lower than the allowable amplitude of the information disc recording/playback apparatus, on the basis of a value in proportion to a vibration acceleration 1 or a vibration acceleration 2, or a value in proportion to the second power of the vibration acceleration 1 or the second power of the vibration acceleration 2, and the track pitch. The vibration accelerations 1 and 2 are represented by $$\text{vibration acceleration } 1[n] = \left(\frac{2\pi V_{rpm}}{60}\right)^2 \frac{2}{\sqrt{3}} \qquad \text{(Formula 16)}$$

$$\sqrt{\left| \begin{array}{c} DAT[n]^2 + DAT[n]DAT \\ {}[n+1] + DAT[n+1]^2 \end{array} \right|}$$

$$\text{vibration acceleration } 2[n] = \left(\frac{2\pi V_{rpm}}{60}\right)^2 \frac{2}{\sqrt{3}} \qquad \text{(Formula 17)}$$

$$\sqrt{\left| \begin{array}{c} DAT[n]^2 - DAT[n]DAT \\ {}[n+2] + DAT[n+2]^2 \end{array} \right|}$$

According to a fifteenth aspect of the present invention, in accordance with the information disc recording/playback apparatus of the fourteenth aspect, the control means determines a maximum rotation speed that is lower than the allowable amplitude of the information disc recording/playback apparatus, on the basis of a value in proportion to an average of twelve vibration accelerations 1 or vibration accelerations 2 which are calculated for n=0–5 according to (Formula 16) and (Formula 17), respectively, and the track pitch, or a value in proportion to an average of m pieces of central values selected from the values of the twelve vibration accelerations 1 or vibration accelerations 2, and the track pitch, or a value in proportion to an average of m pieces of central values selected from the second powers of the twelve vibration accelerations 1 or the second powers of the twelve vibration accelerations 2, and the track pitch.

According to a sixteenth aspect of the present invention, in accordance with the information disc recording/playback apparatus of the first aspect, the track pitch detection means detects the type of the loaded information disc, and selects a track pitch corresponding to the detected disc type, with reference to a table in which standard track pitches corresponding to the respective types of the information discs are described.

According to a seventeenth aspect of the present invention, the information disc recording/playback apparatus of the first aspect further comprises a move distance detection means for detecting the distance by which the reading means moves. Further, the track pitch detection means makes the reading means move for a predetermined period of time or by a predetermined distance when the information disc is loaded, counts the number of tracks the reading means crosses while it is moving, and detects the track pitch on the basis of the move distance and the track cross count.

According to an eighteenth aspect of the present invention, the information recording/playback apparatus of the first aspect further comprises: a linear speed detection means for detecting the linear speed of the information disc; and a playback speed detection means for detecting the current playback speed of the information disc. Further, the track pitch detection means calculates the track pitch of the information disc, on the basis of the detected type of the information disc, the linear speed of the information disc detected by the linear speed detection means, the playback speed detected at a predetermined rotation speed and a predetermined address, the predetermined rotation speed, the predetermined address, the innermost radius of data area which is unique to the detected type of the disc, and the data rate when the disc is played at the predetermined playback speed which is unique to the type of the disc.

According to a nineteenth aspect of the present invention, an information disc recording/playback apparatus is provided that is capable of recording or playing an information disc on which information recording tracks are formed spirally or concentrically. The apparatus comprises: a disc rotation means for rotating the information disc at a predetermined speed; a reading means for reading an information signal from the disc; a drive means for driving the reading means in the direction of the radius of the disc; a track cross detection means for generating track cross pulses on the basis of playback signals that are generated when the reading means crosses the information tracks; a variable filter means for preventing counting of pulses whose widths are narrower than a set value, among the track cross pulses; and a count means for counting the pulses outputted from the variable filter means. The apparatus also comprises a control means for determining a maximum rotation speed that is lower than an allowable number of track crosses of the information disc recording/playback apparatus on the basis of the count, or determining a maximum rotation speed that is lower than an allowable track cross speed or track cross acceleration of the information disc recording/playback apparatus on the basis of the count and the current disc rotation speed, and controlling the disc rotation means so that the disc rotation means rotates the information disc at a speed lower than the allowable maximum rotation speed to record or reproduce data in/from the disc.

According to a twentieth aspect of the present invention, the information disc recording/playback apparatus of the nineteenth aspect, further comprises: a track cross direction detection means for detecting the track cross direction which indicates the direction in which the reading means crosses the information tracks; and a rotation angle detection means for outputting rotation angle information of the disc rotation means. Further, the count means counts the track cross pulses with signs, which are detected by the track cross detection means, on the basis of the result of the detection by the track cross direction detection means and the rotation angle information outputted from the rotation angle detection means.

According to a twenty-first aspect of the present invention, an information disc recording/playback apparatus is provided that is capable of recording or playing an information disc on which information recording tracks are formed spirally or concentrically. The apparatus comprises: a disc rotation means for rotating the information disc at a predetermined speed; a reading means for reading an information signal from the disc; a drive means for driving the reading means in the direction of the radius of the disc; a track cross detection means for generating track cross pulses on the basis of playback signals that are generated when the reading means crosses the information tracks; a variable filter means for preventing counting of pulses whose widths are narrower than a set value, among the track cross pulses; a track cross direction detection means for detecting the track cross direction which indicates the direction in which the reading means crosses the information tracks; and a rotation angle detection means for outputting rotation angle information of the disc rotation means. The apparatus also comprises a count means including a first count means for counting the track cross pulses with signs, which are outputted from the filter means, on the basis of the result of the detection by the track cross direction detection means and the rotation angle information outputted from the rotation angle detection means, and a second count means for counting the track cross pulses outputted from the filter means, without detecting the track cross direction, on the basis of the rotation angle information outputted from the rotation angle detection means. The count means obtains the count of the first or second count means when an initial value of count is set for setting an initial value of the variable filter means, a value of the variable filter is set on the basis of the count and the current rotation speed, the drive means is disabled, and the information disc loaded on the disc rotation means is rotated at a predetermined rotation speed. The count means repeats the process of obtaining the count of the first or second count means when the value of the variable filter is set and the information disc is rotated at the predetermined speed, for a required number of times, thereby obtaining the counts for more than one rotation. The apparatus also comprises a control means for determining a maximum rotation speed that is lower than an allowable number of track crosses of the information disc recording/playback apparatus on the basis of the count, or determining a maximum rotation speed that is lower than an allowable track cross speed or track cross acceleration of the information disc recording/playback apparatus on the basis of the count and the current disc rotation speed, and controlling the disc rotation means so that the disc rotation means rotates the information disc at a speed lower than the allowable maximum rotation speed to record or reproduce data in/from the disc.

According to a twenty-second aspect of the present invention, in accordance with the information disc recording/playback apparatus of the twenty-first aspect, the count means obtains the count of the first count means when the value of the variable filter is set on the basis of the count and the current rotation speed, the drive means is disabled, and the information disc loaded on the disc rotation means is rotated at a predetermined rotation speed. The count means repeats the process of obtaining the count of the first count means when the information disc is rotated at the predetermined speed, for a required number of times, thereby obtaining the counts for more than one rotation.

According to a twenty-third aspect of the present invention, in accordance with the information disc recording/playback apparatus of the twenty-first or twenty-second aspect, when setting the value of the variable filter on the basis of the count and the current rotation speed, if the count is one that is obtained without detecting the track cross direction, assuming that the total number of track crosses per rotation is 4Tc, and the current rotation speed is Vrpm, a maximum track cross speed is calculated by $$\text{maximum track cross speed} = \frac{2\pi V_{rpm}}{60} T_c \qquad \text{(Formula 18)}$$

and, on the basis of the calculated maximum track cross speed, the value of the variable filter is set, and a minimum track count pulse width is set.

According to a twenty-fourth aspect of the present invention, in accordance with the information disc recording/playback apparatus of the twenty-first or twenty-second aspect, the rotation angle detection means divides the rotation angle information of the disc rotation means into six areas for one rotation and outputs the divided rotation angle information. When the count is one that is obtained when the track cross direction is detected, the count at each of the six-divided rotation angles is represented by DAT[n]=DAT[0],DAT[1],DAT[2], DAT[3],DAT[4],DAT[5] (when n>5, n=n mod 6 (a remainder of n being divided by 6), and the rotation speed of the disc rotation means is Vrpm[rpm], a value in proportion to a maximum track cross speed 1 or a maximum track cross speed 2 which are represented as follows are calculated as a maximum track cross speed, $$\text{maximum track cross speed1}[n] = \frac{2\pi V_{rpm}}{60} \frac{2}{\sqrt{3}} \sqrt{\left| \begin{array}{c} DAT[n]^2 + DAT[n]DAT \\ [n+1] + DAT[n+1]^2 \end{array} \right|} \qquad \text{(Formula 19)}$$

$$\text{maximum track cross speed2}[n] = \frac{2\pi V_{rpm}}{60} \frac{2}{\sqrt{3}} \sqrt{\left| \begin{array}{c} DAT[n]^2 - DAT[n]DAT \\ [n+2] + DAT[n+2]^2 \end{array} \right|} \qquad \text{(Formula 20)}$$

and a value in proportion to an average of twelve maximum track cross speeds 1 or maximum track cross speeds 2 which are calculated for n=0~5 according to (Formula 19) and (Formula 20), respectively, or a value in proportion to an average of m pieces of central values selected from the values of the twelve maximum track cross speeds 1 or maximum track cross speeds 2, is employed as a maximum track cross speed.

According to a twenty-fifth aspect of the present invention, in accordance with the information disc recording/playback apparatus of the twenty-fourth aspect, when the value of the variable filter is set on the basis of the count and the current rotation speed, if the count is one that is obtained when the track cross direction is detected, the count at each of the six-divided rotation angles is represented by DAT[n]=DAT[0],DAT[1],DAT[2],DAT[3],DAT[4],DAT[5] (when n>5, n=n mod 6 (a remainder of n being divided by 6), and the rotation speed of the disc rotation means is Vrpm[rpm], a maximum track cross speed is calculated on the basis of the following formulae, $$4T_C = |DAT[0]| + |DAT[1]| + |DAT[2]| + \\ |DAT[3]| + |DAT[4]| + |DAT[5]| \qquad \text{(Formula 21)}$$

$$\text{maximum track cross speed} = \frac{2\pi V_{rpm}}{60} T_C \frac{1}{\cos\frac{\pi}{6}} \qquad \text{(Formula 22)}$$

$$= \frac{2\pi V_{rpm}}{60} T_C \frac{2}{\sqrt{3}}$$

and, on the basis of the maximum track cross speed so calculated, the value of the variable filter is set, and a minimum track count pulse width is set.

According to a twenty-sixth aspect of the present invention, in accordance with the information disc recording/playback apparatus of the nineteenth aspect, when setting the maximum rotation speed of the information disc recording/playback apparatus, the control means employs, as the count, a difference between the track cross count that is obtained when the information disc is rotated at a first rotation speed and at least one rotation speed that is higher than the first rotation speed, and the count obtained with the at least one rotation speed that is higher than the first rotation speed.

According to a twenty-seventh aspect of the present invention, in accordance with the information disc recording/playback apparatus of the nineteenth aspect, the track cross count is the number of track crosses which is calculated on the basis of an average of counts corresponding to more than one rotation, where the counts are selected from among the counts obtained by the repetition.

According to a twenty-eighth aspect of the present invention, in accordance with the information disc recording/playback apparatus of the twenty-seventh aspect, when calculating the track cross count, if the value of the variable filter means which is reset by repetition at the same rotation speed changes by a predetermined value or more, the counts obtained before the change are not used as the counts for calculating the average.

According to a twenty-ninth aspect of the present invention, an information disc recording/playback apparatus is provided that is capable of recording or playing an information disc on which information recording tracks are formed spirally or concentrically. The apparatus comprises: a disc rotation means for rotating the information disc at a predetermined speed; a reading means for reading an information signal from the disc; a drive means for driving the reading means in the direction of the radius of the disc; a track cross detection means for generating track cross signals on the basis of playback signals that are generated when the reading means crosses the information tracks; a pulse width storage means for holding the pulse width of a just-previous track cross signal; a filter means for comparing the pulse width of the just-previous track cross signal with the pulse width of the current track cross signal, and preventing the current track cross signal from being outputted when the current track cross signal is reduced by a predetermined value or more; and a count means for counting the pulses which are outputted from the variable filter means. The apparatus also comprises a control means for determining a maximum rotation speed that is lower than an allowable number of track crosses of the information disc recording/playback apparatus on the basis of the obtained counts for one or more rotation, or determining a maximum rotation speed that is lower than an allowable track cross speed or track cross acceleration of the information disc recording/playback apparatus on the basis of the obtained counts for one or more rotation, and the current disc rotation speed, and controlling the disc rotation means so that the disc rotation means rotates the information disc at a speed lower than the allowable maximum rotation speed to record or reproduce data in/from the disc.

According to a thirtieth aspect of the present invention, in accordance with the information disc recording/playback apparatus of the twenty-ninth aspect, the information disc recording/playback apparatus is able to record or play two or more kinds of information discs having different track pitches. Further, setting of the maximum rotation speed of the information disc recording/playback apparatus is performed by detecting the track pitch of the information disc, and determining a maximum rotation speed that is lower than an allowable vibration amplitude of the information disc recording/playback apparatus on the basis of the count and the track pitch, or determining a maximum rotation speed that is lower than an allowable vibration speed or vibration acceleration of the information disc recording/ playback apparatus on the basis of the count, the track pitch, and the current disc rotation speed.

According to a thirty-first aspect of the present invention, a vibration detection method is provided for an information disc recording/playback apparatus that is capable of recording or playing at least two kinds of information discs having different track pitches, on which information recording tracks are formed spirally or concentrically. The method comprises: a step of detecting the track pitch of the information disc; a step of counting track cross pulses on the basis of playback signals which are generated when the information disc fixedly loaded on the apparatus is rotated and a reading unit crosses the information tracks on the information disc, thereby obtaining a count; a step of determining a maximum rotation speed that is lower than an allowable vibration amplitude of the information disc recording/playback apparatus, on the basis of the obtained count and the track pitch; and a step of determining a maximum rotation speed that is lower than an allowable vibration speed or vibration acceleration of the information disc recording/playback apparatus, on the basis of the count, the track pitch, and the current disc rotation speed.

According to a thirty-second aspect of the present invention, a vibration detection method is provided for an information disc recording/playback apparatus that is capable of recording or playing at least two kinds of information discs having different track pitches, on which information recording tracks are formed spirally or concentrically. The method comprises: a step of detecting the track pitch of the information disc; a step of detecting the track cross direction indicating the direction in which a reading means crosses the information tracks; a step of outputting rotation angle information of the information disc, which is divided into n areas for one rotation; a step of detecting two areas wherein the track cross speed has the lowest value, from among the n-divided areas; a step of counting track cross pulses, which are based on playback signals that are generated when the information disc fixedly loaded onto the apparatus is rotated and the reading means crosses the information tracks on the information disc, such that the track cross pulses with signs are counted while detecting the track cross direction in an area where the track cross speed has the lowest value, on the basis of the detected track cross direction and the rotation angle information; a step of counting track cross pulses, which are based on playback signals that are generated when the information disc fixedly loaded onto the apparatus is rotated and the reading means crosses the information tracks on the information disc, such that the track cross pulses with signs are counted without detecting the track cross direction, on the basis of the track cross direction which has just previously been detected, in an area where the track cross speed does not have the lowest value; a step of determining a maximum rotation speed that is lower than an allowable vibration amplitude of the information disc recording/playback apparatus, on the basis of the obtained count and the track pitch; and a step of determining a maximum rotation speed that is lower than an allowable vibration speed or vibration acceleration of the information disc recording/ playback apparatus, on the basis of the count, the track pitch, and the current disc rotation speed.

According to a thirty-third aspect of the present invention, a vibration detection method is provided for an information disc recording/playback apparatus that is capable of recording or playing at least two kinds of information discs having different track pitches, on which information recording tracks are formed spirally or concentrically. The method comprises: a step of detecting the track pitch of the information disc; a step of detecting the track cross direction indicating the direction in which a reading means crosses the information tracks; a step of outputting rotation angle information of the information disc, which is divided into n areas for one rotation; a step of detecting two areas wherein the track cross speed has the lowest value, from among the n-divided areas; a step of obtaining a first count on the basis of playback signals which are generated when the information disc fixedly loaded onto the apparatus is rotated and the reading means crosses the information tracks on the information disc; a step of obtaining a second count in which a sign is added to the count, on the basis of the track cross direction which has just previously been detected, when the information disc is rotated; a step of selecting the first count in an area where the track cross speed has the lowest value, and selecting the second count in an area where the track cross speed does not have the lowest value, thereby counting the track cross pulses for every rotation angle and outputting the count; a step of determining a maximum rotation speed that is lower than an allowable vibration amplitude of the information disc recording/playback apparatus, on the basis of the obtained count and the track pitch; and a step of determining a maximum rotation speed that is lower than an allowable vibration speed or vibration acceleration of the information disc recording/playback apparatus, on the basis of the count, the track pitch, and the current disc rotation speed.

According to a thirty-fourth aspect of the present invention, a vibration detection method is provided for an information disc recording/playback apparatus that is capable of recording or playing at least two kinds of information discs having different track pitches, on which information recording tracks are formed spirally or concentrically. The method comprises: a step of detecting the track pitch of the information disc; a step of counting track cross pulses on the basis of playback signals which are generated when the information disc fixedly loaded onto the apparatus is rotated at a first rotation speed and a reading unit crosses the information tracks on the information disc, thereby obtaining a count; a step of calculating a difference between a track cross count which is obtained when the information disc is rotated with at least one rotation speed that is higher than the first rotation speed, and a count which is obtained when the information disc is rotated at the first rotation speed, thereby obtaining a difference count; a step of determining a maximum rotation speed that is lower than an allowable vibration amplitude of the information disc recording/playback apparatus, on the basis of the obtained difference count and the track pitch; and a step of determining a maximum rotation speed that is lower than an allowable vibration speed or vibration acceleration of the information disc recording/playback apparatus, on the basis of the difference count, the track pitch, and the current disc rotation speed.

According to a thirty-fifth aspect of the present invention, a vibration detection method is provided for an information disc recording/playback apparatus that is capable of recording or playing an information disc on which information recording tracks are formed spirally or concentrically. The method comprises: a step of counting track cross pulses on the basis of playback signals which are generated when the information disc fixedly loaded on the apparatus is rotated and a reading unit crosses the information tracks on the information disc, thereby obtaining a count; a step of comparing the widths of the detected track pulses with a predetermined value, and invalidating the counts of track pulses whose widths are shorter than the predetermined value; a step of determining a maximum rotation speed that is lower than an allowable number of track crosses of the information disc recording/playback apparatus, on the basis of the count; and a step of determining a maximum rotation speed that is lower than an allowable track cross speed or track cross acceleration, on the basis of the count and the current disc rotation speed.

According to a thirty-sixth aspect of the present invention, a vibration detection method is provided for an information disc recording/playback apparatus that is capable of recording or playing an information disc on which information recording tracks are formed spirally or concentrically. The method comprises: a step of counting track cross pulses on the basis of playback signals which are generated when the information disc fixedly loaded on the apparatus is rotated and a reading unit crosses the information tracks on the information disc, thereby obtaining a count; a step of detecting the track cross direction indicating the direction in which the reading means crosses the information tracks; a step of outputting rotation angle information of the information disc; a step of comparing a set pulse width with the pulse width of the current track cross pulse, and invalidating the count of the current track cross pulse when its pulse width is decreased by a predetermined value or more; a first count step of counting the track cross pulses with signs, whose widths are not decreased by the predetermined value or more, on the basis of the track cross direction and the rotation angle information; a second count step of counting the track cross pulses whose widths are not decreased by the predetermined value or more, without detecting the track cross direction, on the basis of the rotation angle information; a step of setting the set pulse widths by repeating the steps of obtaining the first and second counts by a required number of times; a step of obtaining a count corresponding to one or more rotation of the information disc, by obtaining the counts obtained in the first and second count steps using the repeatedly set pulse widths; a step of determining a maximum rotation speed that is lower than an allowable number of track crosses of the information disc recording/playback apparatus, on the basis of the count; and a step of determining a maximum rotation speed that is lower than an allowable track cross speed or track cross acceleration, on the basis of the count and the current disc rotation speed.

According to a thirty-seventh aspect of the present invention, a vibration detection method is provided for an information disc recording/playback apparatus that is capable of recording or playing an information disc on which information recording tracks are formed spirally or concentrically, which method comprises: a step of counting track cross pulses on the basis of playback signals which are generated when the information disc fixedly loaded on the apparatus is rotated and a reading unit crosses the information tracks on the information disc, thereby obtaining a count; a step of storing the pulse width of a track cross pulse which has just previously been detected; a step of comparing the stored track cross pulse width with the pulse width of the current track cross pulse, and invalidating the count of the current track cross pulse when its pulse width is decreased by a predetermined value or more; a step of determining a maximum rotation speed that is lower than an allowable number of track crosses of the information disc recording/playback apparatus, on the basis of the count; and a step of determining a maximum rotation speed that is lower than an allowable track cross speed or track cross acceleration, on the basis of the count and the current disc rotation speed.

As described above, according to an information disc recording/playback apparatus and a vibration detection method for the information disc recording/playback apparatus relating to the present invention, an information disc recording/playback apparatus is provided that is capable of recording or playing at least two kinds of information discs having different track pitches, on which information recording tracks are formed spirally or concentrically. The apparatus comprises: a disc rotation means for rotating the information disc at a predetermined speed; a reading means for reading an information signal from the disc; a drive means for driving the reading means in the direction of the radius of the disc; a track pitch detection means for detecting the track pitch of the information disc from the information disc; a track cross detection means for generating track cross signals on the basis of playback signals that are generated when the reading means crosses the information tracks; and a count means for counting track cross pulses that are detected by the track cross detection means, and outputting the count. The apparatus also comprises a control means for determining a maximum rotation speed that is lower than an allowable vibration amplitude of the information disc recording/playback apparatus on the basis of the count and the track pitch, or determining a maximum rotation speed that is lower than an allowable vibration speed or vibration acceleration speed of the information disc recording/playback apparatus on the basis of the count, the track pitch, and the current disc rotation speed, and controlling the disc rotation means so that the disc rotation means rotates the information disc at a speed lower than the allowable maximum rotation speed to record or reproduce data in/from the disc. Therefore, the vibration amplitude, or vibration speed, or vibration acceleration is evaluated by considering the track pitch of the disc, and the maximum rotation speed lower than the allowable vibration amplitude, vibration speed, or vibration acceleration of the information disc recording/playback apparatus is determined, whereby vibration detection can be carried out by using a single threshold value, regardless of the type of the information disc.

Furthermore, according to an information disc recording/ playback apparatus and a vibration detection method for the information disc recording/playback apparatus relating to the present invention, an information disc recording/playback apparatus is provided that is capable of recording or playing an information disc on which information recording tracks are formed spirally or concentrically. The apparatus comprises: a disc rotation means for rotating the information disc at a predetermined speed; a reading means for reading an information signal from the disc; a drive means for driving the reading means in the direction of the radius of the disc; a track cross detection means for generating track cross pulses on the basis of playback signals that are generated when the reading means crosses the information tracks; a variable filter means for preventing counting of pulses whose widths are narrower than a set value, among the track cross pulses; and a count means for counting the pulses outputted from the variable filter means. The apparatus also comprises a control means for determining a maximum rotation speed that is lower than an allowable number of track crosses of the information disc recording/playback apparatus on the basis of the count, or determining a maximum rotation speed that is lower than an allowable track cross speed or track cross acceleration of the information disc recording/playback apparatus on the basis of the count and the current disc rotation speed, and controlling the disc rotation means so that the disc rotation means rotates the information disc at a speed lower than the allowable maximum rotation speed to record or reproduce data in/from the disc. Since setting of the track cross filter is carried out on the basis of the track cross count and the current rotation speed, even when the track cross speed varies significantly due to the eccentricity or vibration of the disc, track counting most suitable for vibration detection can be accurately carried out at all times.

Furthermore, according to an information disc recording/ playback apparatus relating to the present invention, an information disc recording/playback apparatus is provided that is capable of recording or playing an information disc on which information recording tracks are formed spirally or concentrically. The apparatus comprises: a disc rotation means for rotating the information disc at a predetermined speed; a reading means for reading an information signal from the disc; a drive means for driving the reading means in the direction of the radius of the disc; a track cross detection means for generating track cross signals on the basis of playback signals that are generated when the reading means crosses the information tracks; a pulse width storage means for holding the pulse width of a just-previous track cross signal; a filter means for comparing the pulse width of the just-previous track cross signal with the pulse width of the current track cross signal, and preventing the current track cross signal from being outputted when the current track cross signal is reduced by a predetermined value or more; and a count means for counting the pulses which are outputted from the variable filter means. The apparatus also comprises a control means for determining a maximum rotation speed that is lower than an allowable number of track crosses of the information disc recording/ playback apparatus on the basis of the obtained counts for one or more rotation, or determining a maximum rotation speed that is lower than an allowable track cross speed or track cross acceleration of the information disc recording/ playback apparatus on the basis of the obtained counts for one or more rotation, and the current disc rotation speed, and controlling the disc rotation means so that the disc rotation means rotates the information disc at a speed lower than the allowable maximum rotation speed to record or reproduce data in/from the disc. Therefore, when the current pulse width is smaller than the previous pulse width by a predetermined value, this pulse is judged as one that is caused by a false detection due to noise and is not counted, whereby track counting that is most suitable for vibration detection can be accurately carried out at all times, without requiring time for excess measurement.

DETAILED DESCRIPTION OF THE INVENTION

First Embodiment

An information disc recording/playback apparatus and a vibration detection method for the information disc recording/playback apparatus according to a first embodiment of the present invention will be described taking a DVD-ROM player as an example, with reference to FIG. 1.

Figure 1:
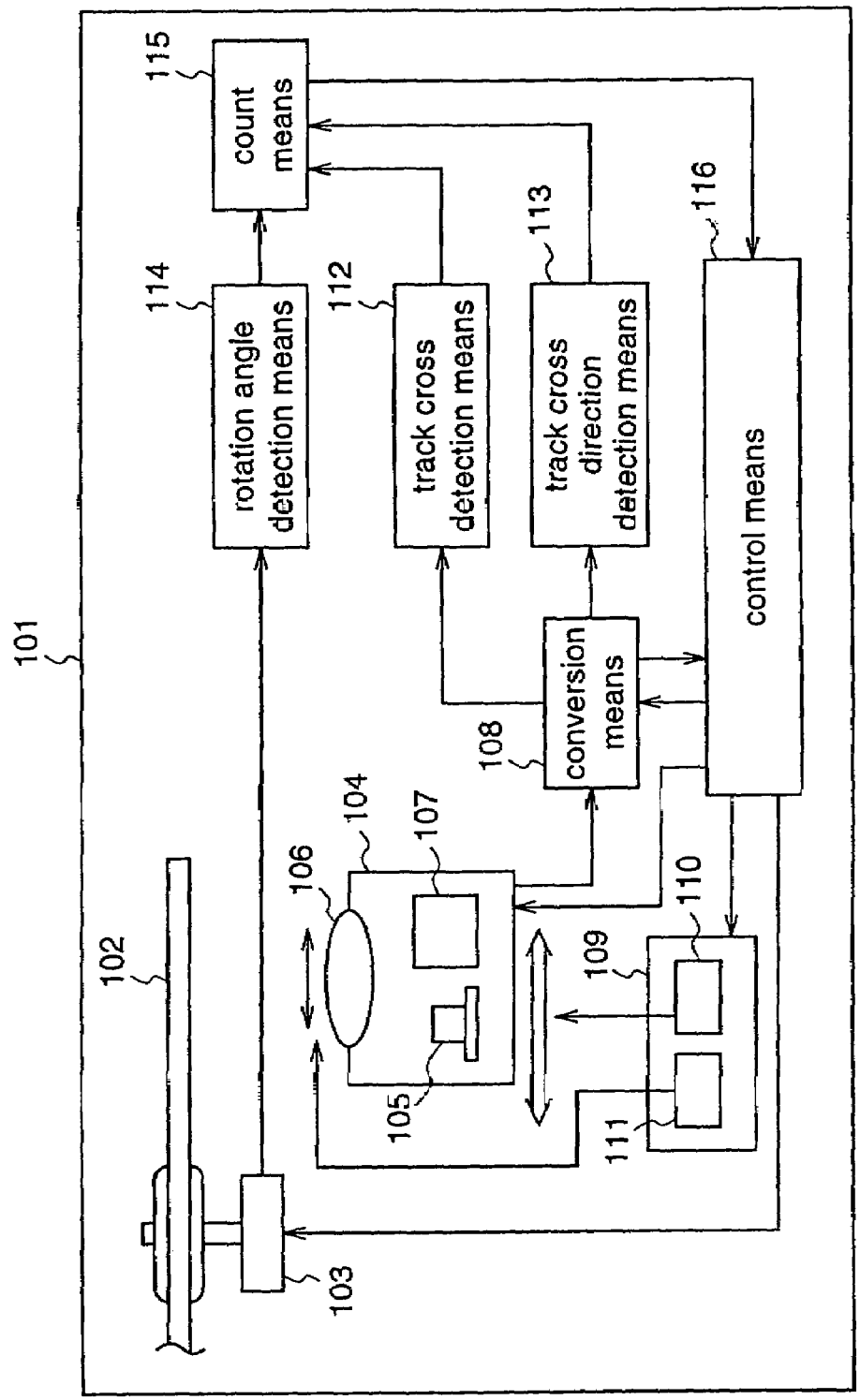
FIG. 1 is a block diagram illustrating the construction of a DVD-ROM player in the case where an information disc recording/playback apparatus and a vibration detection method for the information disc recording/playback apparatus according to a first or fourth embodiment of the invention are applied to the DVD-ROM player.

In FIG. 1, a DVD-ROM player 101 is able to play various kinds of optical discs 102. The DVD-ROM player 101 according to this first embodiment is able to play the following discs: CD-ROM (CD-ROM, CD-R, CD-RW), DVD-ROM (DVD-5, DVD-9, DVD-R4.7G), and DVD-R3.9G, and the standard track pitches of these discs are as follows:

| | |
|---|---|
| CD-ROM | 1.6 μm |
| DVD-ROM | 0.74 μm |
| DVD-R3.9G | 0.80 μm |

Reference numeral 103 denotes a disc rotation means for rotating the optical disc 102 mounted on the DVD-ROM player 101 at a predetermined rpm. Reference numeral 104 denotes a reading means for reading an information signal from the optical disc 102. In the DVD-ROM player 101, the reading means 104 comprises, for example, a laser emission element 105 for emitting two laser beams having different oscillation wavelengths, one for a CD-ROM and the other for a DVD-ROM; an objective lens 106 for converging the laser beams; and a two-element photodetector 107, one for a CD-ROM and the other for a DVD-ROM. The reading means 104 amplifies the outputs from the photodetector 107, selects one of the output signals from the photodetector 107 according to the type of the optical disc 102, generates a tracking error (TE) signal, a focus error (FE) signal, a playback signal (RF), an All Sum signal (AS), an RF envelope signal (RFENV) and the like, and outputs these signals.

Reference numeral 108 denotes a conversion means for converting the playback signal outputted from the reading means 104 into digital data. Reference numeral 109 denotes a drive means for driving the reading means 104 in the direction of the radius of the optical disc 102. This drive means 109 comprises, for example, a traverse drive means 110 for driving the whole reading means 104 in the direction of the radius of the optical disc, and a tracking actuator 111 for minutely driving the objective lens 106 included in the reading means 104, in the direction of the radius of the optical disc.

Reference numeral 112 denotes a track cross detection means for generating track cross pulses on the basis of playback signals which are generated when the laser beam outputted from the reading means 104 crosses the tracks on the optical disc 102. Reference numeral 113 denotes a track cross direction detection means for detecting the direction along which the laser beam from the reading means 104 crosses the tracks on the optical disc. The track cross detection means 112 or the track cross direction detection means 113 binarizes the tracking error signal outputted from the reading means 104 with a hysteresis comparator or a comparator to generate a track count signal TKC. Likewise, the track cross detection means 112 or the track cross direction detection means 113 generates a non-on track signal OFTR from the envelope of the RF signal, and generates a track cross direction signal according to the phase relationship between the TKC and the OFTR, or generates a track cross detection pulse by directly using the TKC or by latching the TKC with the OFTR.

Reference numeral 114 denotes a rotation angle detection means for detecting the rotation angle of the disc rotation means 103. The rotation angle detection means 114 generally utilizes a signal called an FG pulse that is generated from the output of a Hall element of a disc motor. As the FG signal outputs three pulses for one rotation with a three-phase motor, rotation angle detection in units of 60 degrees is possible by counting both of a rising edge and a falling edge. Further, there are proposed a method of performing more accurate rotation angle detection by frequency-dividing the FG pulse, and a method of detecting the rotation speed at an arbitrarily resolution by providing the disc motor with a rotation speed detection means using an encoder.

Reference numeral 115 denotes a count means for counting the number of track crosses including the direction, on the basis of the output from the rotation angle detection means 105, and the outputs from the track cross detection means 112 and the track cross direction detection means 113. In the above-mentioned case where the rotation angle can be detected at every 60 degrees, one rotation is divided into six areas, and a signed track count is obtained for each area.

Reference numeral 116 denotes a control means for processing the signals supplied from the conversion means 108 and the count means 115, and controlling the disc rotation means 103, the reading means 104, the conversion means 108, and the drive means 109.

Next, the operation of the DVD-ROM player 101 will be described. Initially, a description will be given of a step in which the control means 116 sets a maximum rotation speed of the DVD-ROM player.

A step of detecting the track pitch of the optical disc 102 will be described taking, for example, a method of determining the type of the information disc and selecting a standard track pitch according to the information about the disc type. Usually, the DVD-ROM player 101 can play plural types of information discs as described above, and the required light source and the method for generating a detection signal vary among the plural disc types. Therefore, initially, the type of the loaded disc is determined by various methods. For example, the loaded information disc is discriminated between a ROM (CD-ROM/R, DVD-ROM/R) disc and a rewritable disc (CD-RW), from the reflectivity of the information disc, by using a CD laser, on the basis of the amplitude of a focus error signal obtained in focus search. Furthermore, the loaded information disc is discriminated between a DVD disc and a CD disc, from the degree of modulation of an RF signal. Thereafter, required light source and signal path are selected. Finally, it is checked whether or not TOC (TABLE OF CONTENTS) information can be read from the disc, and further, it is checked whether or not the disc type selected from the contents of the TOC information is correct. Then, the standard value of the track pitch according to the disc type is selected.

In a step of obtaining the result of counting by the count means 115 when the disc is rotated at the first rotation speed, the drive means 104 is disabled, and the optical disc 102 is rotated at the first rotation speed by controlling the disc rotation means 103. Then, the result of counting by the count means 115 is captured. In this first embodiment, using a three-phase motor, the rotation angle is detected at the rising and falling edges of an FG signal outputted from a Hall element, and the counted number of track crosses is obtained at every rotation angle of 60 degrees. Further, in this first embodiment, the first rotation speed is set at a sufficiently low speed which does not cause vibration between the reading means 104 and the optical disc 102, and the number of track crosses caused by only the eccentricity between the optical disc 102 and the disc rotation means 103 is measured.

Also in a step of obtaining the count of the count means 115 when the optical disc 102 is rotated with at least one rotation speed that is higher than the first rotation speed, the number of track crosses can be counted at every rotation angle of 60 degrees, as in the step of obtaining the count of the count means 115 when the disc is rotated at the first rotation speed. In this first embodiment, the count is obtained at the maximum rotation speed that is set for every disc type of the DVD-ROM player.

Next, each of the counts obtained when the disc is rotated at the first speed and the at least one speed higher than the first speed is multiplied by the track pitch which is detected in the track pitch detection step, thereby obtaining data of the track cross amount. In this embodiment, data of the track cross amount at every 60 degrees is calculated from the number of tracks counted at every rotation angle of 60 degrees.

In a step of calculating the vibration amplitude of the optical disc 102 with respect to the reading means 104, the track cross amount detected at the first rotation speed is compared with the track cross amount detected with the at least one rotation speed higher than the first speed, and the vibration amplitude of the information disc with respect to the reading means 104 is calculated on the basis of a difference between the track cross amounts. In this first embodiment, a difference between the track cross amount detected at the first rotation speed and the track cross amount detected at the maximum rotation speed is obtained at every rotation angle of 60 degrees, thereby calculating a track cross component due to the vibration. Then, the vibration amplitude is obtained on the assumption that the vibration is a sinusoidal wave.

In a step of determining the maximum rotation speed, a comparison is carried out as to whether or not the previously obtained vibration amplitude is lower than a reference value. When the previously obtained vibration amplitude is lower than the reference value, the maximum rotation speed that is set for every disc type is employed, and when the previously obtained vibration amplitude is higher than the reference value, a rotation speed lower than the maximum rotation speed is employed.

Then, reproduction of data is carried out at a speed lower than the set maximum rotation speed.

Next, a description will be given of a case where vibration of a CD-ROM is to be detected.

A CD-ROM disc loaded on the DVD-ROM player 101 is fixed to the disc rotation means 103. Next, a focus search is carried out with a laser beam for CD-ROM, and the amplitude of a focus error signal is measured. As a result, the loaded CD-ROM disc is judged as a ROM disc because its reflectivity is relatively high. Next, the CD-ROM disc is rotated at a predetermined speed by the disc rotation means 103, and the degree of modulation of an RF signal is measured. The measured degree of modulation is compared with a reference value, whereby the CD-ROM disc is judged as a CD disc. Consequently, the result of disc judgement is a CD-ROM. Also when a DVD-ROM disc is employed, the disc is judged as a DVD-ROM disc in the same manner as described above, and then it is checked whether the DVD-ROM disc is a DVD-R4.7G (track pitch: 0.74 μm) or a DVD-R3.9G (track pitch: 0.8 μm) by reading the TOC information, whereby the track pitch can be detected.

Next, the CD-ROM disc is rotated at a sufficiently low speed, 1200 rpm, which does not cause vibration between the disc and the reading means 104. Then, the traverse drive means 110 and the tracking actuator 111 are disabled, and the count of the count means 115 is obtained at every rotation angle of 60 degrees. Since no vibration occurs between the disc and the reading means 104, the count due to only the eccentricity component between them is obtained. For example, the count may be obtained by a method of performing counting for plural rotations with one rotation as a unit, and averaging the obtained counts, or a method of performing counting for plural rotations as described above, and selecting, from the obtained counts, plural counts which are not supposed to be false counts.

Next, the CD-ROM disc is rotated at the maximum rotation speed of the CD-ROM disc. In this example, the CD-ROM disc is able to perform CAV playback at 24× (maximum)-speed, 12×-speed, and 6×-speed. Since the maximum rotation speed is 5000 rpm, the 12×-speed is 2500 rpm, and the 6×-speed is 1250 rpm, the count when the disc is rotated at 5000 rpm is obtained.

Next, a difference between the counts obtained at 1200 rpm and 5000 rpm for every rotation angle is calculated, whereby the track count due to the vibration at 5000 rpm, excluding the eccentricity component, is obtained.

Finally, the vibration amplitude of this disc is evaluated from this track count and the track pitch, or the vibration speed or vibration acceleration is evaluated from the track count, the track pitch and the rotation speed of 5000 rpm, and it is decided whether or not the disc is to be rotated at the maximum rotation speed or not, according to whether the vibration amplitude, or the vibration speed, or the vibration acceleration is lower than the allowable value or not. For example, when it is higher than the allowable value, the maximum rotation speed is reduced to 2500 rpm of the 12×-speed.

As described above, according to the first embodiment, the vibration amount, vibration speed, or vibration acceleration is evaluated considering the track pitch of the disc, and a maximum rotation speed that is lower than the allowable vibration amplitude, vibration speed, or vibration acceleration of the information disc recording/playback apparatus is decided. Therefore, vibration detection can be carried out by using a single threshold value, independently of the type of the information disc.

In this first embodiment, counting of the track crosses is carried out at plural rotation speeds while detecting the rotation angle, and a difference between them is calculated to obtain the track count due to vibration. However, a method of simply counting the track crosses at plural rotation speeds without detecting the rotation angle and then taking a difference between them, or a method of counting the track crosses at a single rotation speed without detecting the rotation angle may be employed.

Furthermore, while in this first embodiment an evaluation of vibration is performed on the basis of a difference between the count obtained at a low speed at which no vibration occurs and the count obtained at the maximum rotation speed, the evaluation of vibration may be performed on the basis of a difference between the count obtained at a rotation speed at which vibration occurs and the count obtained at the maximum rotation speed. Further, a rotation speed lower than the maximum rotation speed may be employed instead of the maximum rotation speed. Furthermore, the evaluation may be carried out at two or more rotation speeds, and the playback speed may be set as follows: the maximum rotation speed, a speed lower than the maximum rotation speed, a speed lower than that speed . . . .

Moreover, in this first embodiment, the counted number of track crosses is multiplied by the track pitch to obtain data of the track cross amount, the track cross amount due to vibration is calculated by operating the track cross amount, and the vibration amplitude is obtained on the basis of the track cross amount due to vibration. However, as for the track pitch of the disc, the value of the track pitch itself may be employed, or the ratio of track pitches of plural discs may be employed. Furthermore, when the number of track crosses due to vibration is obtained by operating the result of counting, the number of track crosses may be multiplied by the track pitch to obtain the track cross amount due to vibration and, thereafter, the vibration amplitude may be obtained. Alternatively, the vibration amount with the number of track crosses as a unit may be obtained, and the vibration amount may be multiplied by the track pitch to obtain the vibration amplitude.

Furthermore, while in this first embodiment the vibration amplitude is obtained and compared with a reference value, not the vibration amplitude itself but a value in proportion to the vibration amplitude or a value in proportion to the second power of the vibration amplitude may be calculated to be compared with the reference value. Further, the vibration speed or vibration acceleration may be obtained instead of the vibration amplitude.

While in this first embodiment detection of vibration of a CD-ROM disc is described, vibrations of discs having different track pitches, such as a DVD and a DVD-R3.9G, can be detected in like manner as described above.

While in this first embodiment a DVD-ROM player capable of playing CD-ROM, DVD-ROM, DVD-R3.9G, and DVD-R4.7G is described as an example, any information disc player may be employed as long as it can play plural kinds of information discs having different track pitches.

Furthermore, while in this first embodiment a DVD-ROM player is described as an example, the present invention is applicable to a case where a maximum recording speed at recording is set in other writable recording/playback apparatuses such as CD-R, CD-RW, and DVD-R.

Second Embodiment

Hereinafter, an information disc recording/playback apparatus and a vibration detection method for the information disc recording/playback apparatus according to a second embodiment of the present invention will be described, taking a DVD-ROM player as an example, with reference to FIG. 2.

Figure 2:
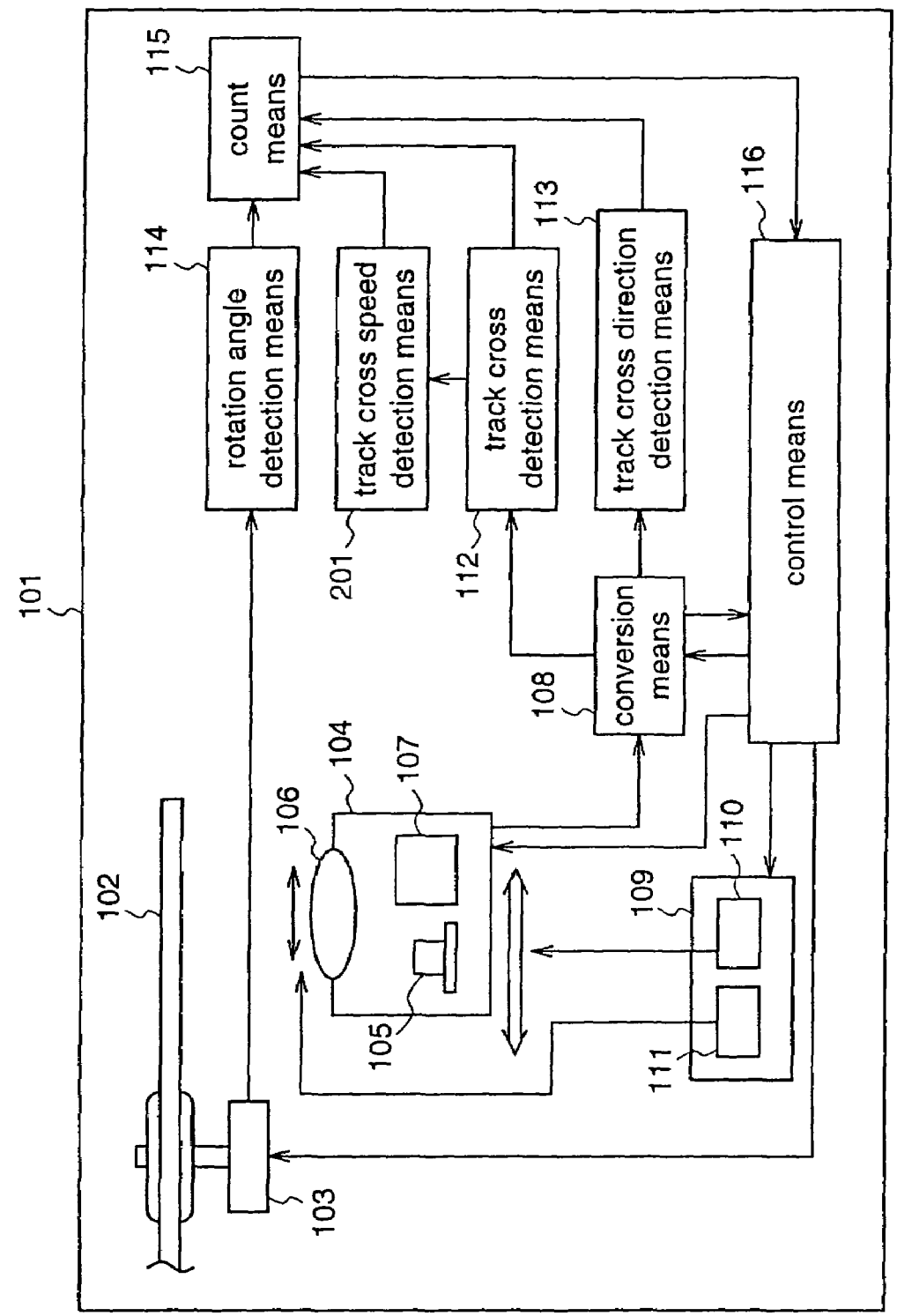
FIG. 2 is a block diagram illustrating the construction of a DVD-ROM player in the case where an information disc recording/playback apparatus and a vibration detection method for the information disc recording/playback apparatus according to a second embodiment of the invention are applied to the DVD-ROM player.

In FIG. 2, the same reference numerals as those shown in FIG. 1 denote the same or corresponding parts, and reference numeral 201 denotes a track cross speed detection means for detecting a track cross speed on the basis of the output from the track cross detection means 112.

The count means 115 counts the track count pulses while detecting the direction when the track cross speed is lower than a predetermined value, and counts the track count pulses without detecting the direction when the track cross speed is higher than the predetermined value, on the basis of the output from the track cross speed detection means 201. When it is switched to "without direction detection", the track cross direction can be known on the basis of the direction that is obtained when counting with direction detection has most recently been carried out.

The maximum speed at which track counting with direction detection can be carried out depends on the track counting method or the disc type.

For example, when tracking error detection is carried out by the three-beam method for a CD or by the phase difference method for a DVD, the three-beam method is generally able to perform direction detection at a higher speed. Accordingly, a threshold value for determining as to whether or not track counting is to be carried out with direction detection may be set for each disc type, or it may be set adaptively to a disc of the lowest speed at which track counting with direction detection is possible.

As described above, according to the second embodiment, the track cross speed detection means 201 is provided, and the track counting method is changed by detecting the track cross frequency. Therefore, even when detection of the track cross direction is difficult because of the change in the track cross speed, track counting can be performed with accuracy, whereby accurate vibration detection can be performed at all times.

Third Embodiment

Hereinafter, an information disc recording/playback apparatus and a vibration detection method for the information disc recording/playback apparatus according to a third embodiment of the present invention will be described, taking a DVD-ROM player as an example, with reference to FIGS. 3 and 6.

Figure 3:
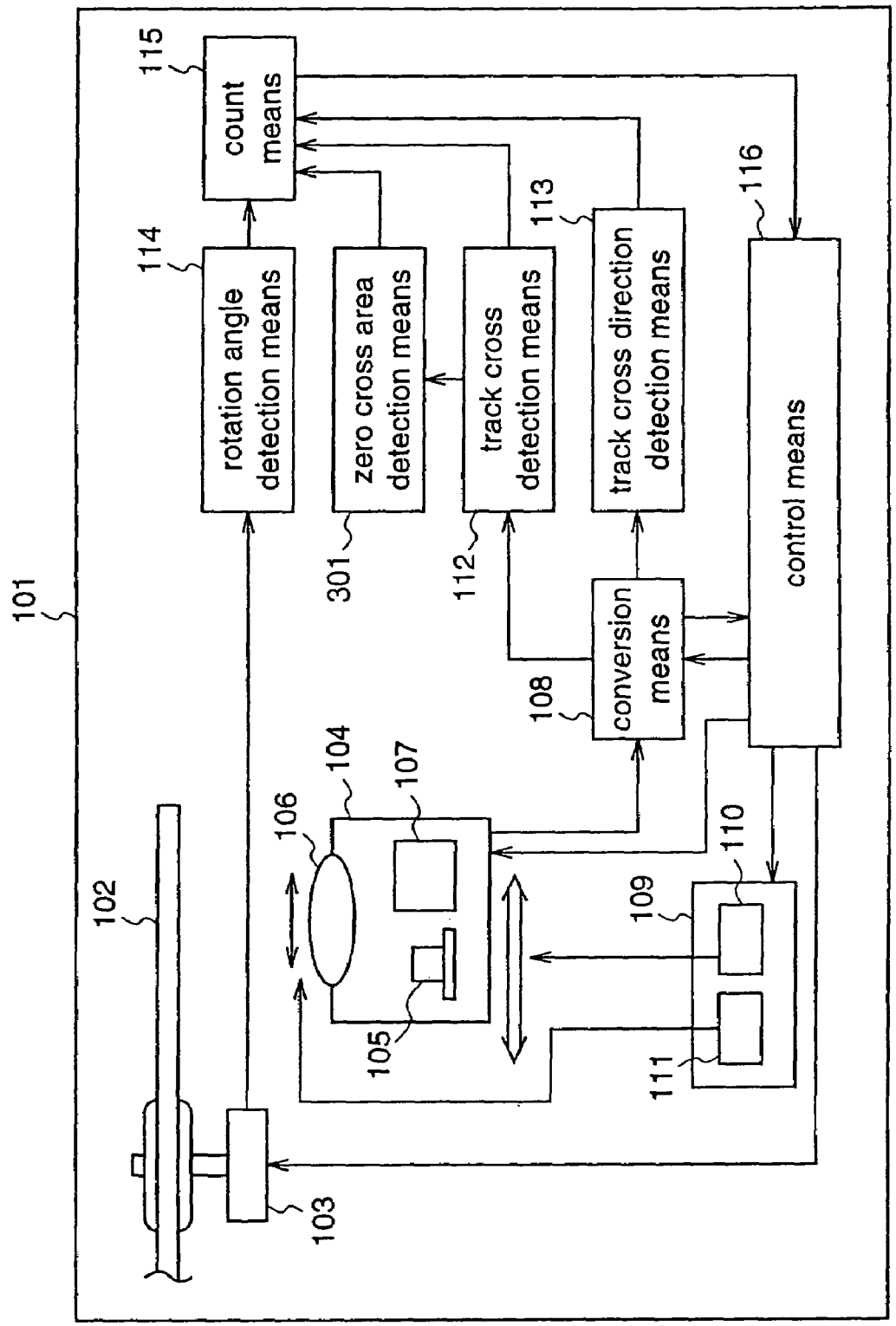
FIG. 3 is a block diagram illustrating the construction of a DVD-ROM player in the case where an information disc recording/playback apparatus and a vibration detection method for the information disc recording/playback apparatus according to a third embodiment of the invention are applied to the DVD-ROM player.

In FIG. 3, the same reference numerals as those shown in FIG. 1 denote the same or corresponding parts, and reference numeral 301 denotes a zero cross area detection means for detecting an area where the track cross speed has the lowest value. The rotation angle detection means 114 usually employs a signal called an FG pulse that is generated from the output of a Hall element of a disc motor. Since the FG signal outputs three pulses for one rotation with a three-phase motor, rotation angle detection in units of 60 degrees can be carried out by counting both of rising and falling edges. In this third embodiment, a description will be given of a case where rotation angle detection is performed in units of 60 degrees using the FG pulses.

The zero cross area detection means 301 detects two areas each including a position where the track cross speed has the lowest value. For example, there may be employed a method of detecting areas where the track cross speed has the lowest value by using the track cross speed detection means 112, or a method of detecting, as zero cross areas, an area where the absolute value of the track count has the lowest value, and an area on a diagonal line with respect to the area from among the six-divided areas.

Hereinafter, a description will be given of the reason why the area where the absolute value of the track count has the lowest value and the area on a diagonal line with respect to this area, among the six-divided areas, are zero cross areas.

Figure 6:
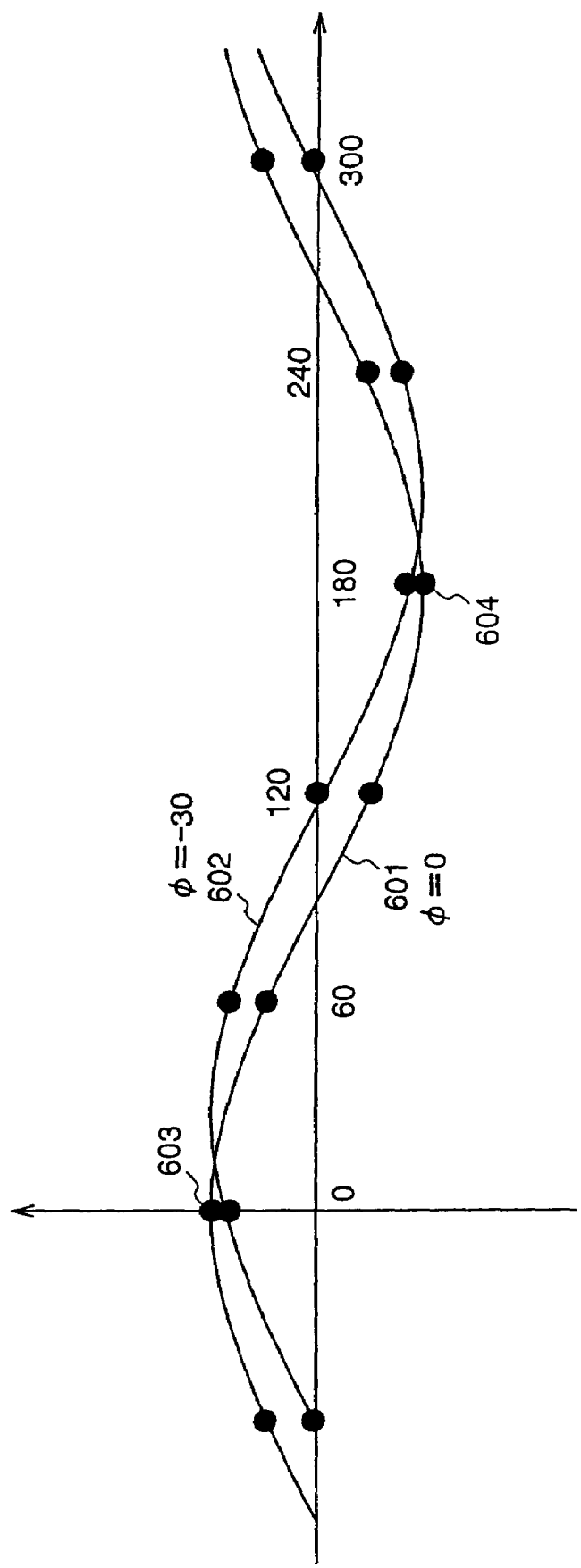
FIG. 6 is a diagram illustrating a graph showing the amount of displacement of the count at every rotation angle, which displacement is caused by vibration or eccentricity, when the present invention is applied to the DVD-ROM player.

FIG. 6 is a graph illustrating the amount of displacement of the count by the count means 115 at every rotation angle, which displacement is caused by vibration or eccentricity. A count DAT[n] in a zero cross area within a range of $\phi=0\sim60°$, which is a signed count obtained when performing direction detection, is represented by $$DAT[n] = T_c \cos(\phi) - T_c \cos(\phi - 60)$$ (Formula 23)

Likewise, counts DAT[n+1] and DAT[n+2π in two areas which are not zero cross areas, within a range of φ=0~60°, are represented by $$DAT[n+1]=T_c \cos(\phi+60)-T_c \cos(\phi) \quad \text{(Formula 24)}$$

$$DAT[n+2]=T_c \cos(\phi+120)-T_c \cos(\phi+60) \quad \text{(Formula 25)}$$

A maximum value of |DAT[n]| within this range is represented by when φ=0, 60°, $$|DAT[n]|=0.5T_c$$

Likewise, minimum values of DAT[n+1] and DAT[n+2] are represented by when φ=0°, $$|DAT[n+1]|=0.5T_c$$

when φ=60°, $$|DAT[n+2]|=0.5T_c$$

Accordingly, the following relationship always holds.

$$|DAT[n]| \geq |DAT[n+1]|, |DAT[n+2]|$$

Likewise, when the count is obtained without performing direction detection, since only the number of track crosses is counted disregarding the track cross direction, a count DAT[n] in a zero cross area, within a range of φ=0~60°, with cos(0) as a boundary, is represented by $$DAT[n]=|T_C(\cos(0)-\cos(\phi))|+|T_x(\cos(\phi-60)-\cos(0))| \quad \text{(Formula 26)}$$

and, as in the above-described case of performing direction detection, counts in two areas which are not the zero cross areas are represented by $$DAT[n+1]=T_c \cos(\phi+60)-T_c \cos(\phi) \quad \text{(Formula 27)}$$

$$DAT[n+2]=T_c \cos(\phi+120)-T_c \cos(\phi+60) \quad \text{(Formula 28)}$$

A maximum value of |DAT[n]| within this range is represented by when φ=0, 60°, $$|DAT[n]|=0.5T_c$$

Likewise, minimum values of DAT[n+1] and DAT[n+2] are represented by when φ=0°, $$|DAT[n+1]|=0.5T_c$$

when φ=60°, $$|DAT[n+2]|=0.5T_c$$

Accordingly, also in this case, the following relationship always holds.

$$|DAT[n]| \geq |DAT[n+1]|, |DAT[n+2]|$$

Next, an example of specific operation according to the third embodiment will be described.

Initially, the optical disc 102 is rotated at a predetermined rotation speed. After the traverse drive means 110 and the tracking actuator 111 are disabled, the count of the count means 115 is obtained for every rotation angle of 60 degrees. At this time, the count is obtained by any of the following methods: a method of obtaining the count with direction detection for an area which is judged as a zero cross area by the zero cross area detection means 301 while obtaining the count without direction detection for other areas; a method of obtaining the count with direction detection and the count without direction detection separately, and selecting the count with direction detection for the zero cross area while selecting the count without direction detection for other areas; and a method of obtaining the count with direction detection and the count without direction detection at the same time, and selecting the count with direction detection for the zero cross area while selecting the count without direction detection for other areas. Further, an area that adopts the data without direction detection can obtain the same count as that with direction detection by adding the sign of a just previous area that adopts the data with direction detection, or by adding the sign of a further previous area if the just previous area adopts the data without direction detection.

As described above, according to the third embodiment of the present invention, since the zero cross area detection means 301 is provided, the track cross detection method is switched between the area where the track cross speed has the lowest value and the other areas, among the areas divided with the rotation angle obtained by the rotation angle detection means 114, and track counting is carried out with direction detection for the area where the track cross speed has the lowest value while the track counting is carried out without direction detection for the other areas, whereby the optimum track counting method can be selected according to variations in the track cross speed, and accurate vibration detection can be carried out at all times.

Fourth Embodiment

Hereinafter, an information disc recording/playback apparatus and a vibration detection method for the information disc recording/playback apparatus according to a fourth embodiment of the present invention will be described taking a DVD-ROM player as an example, with reference to FIG. 1.

Since the fundamental construction of the apparatus is identical to that of the first embodiment, repeated description is not necessary. Next, an example of specific operation of this fourth embodiment will be described employing the rotation angle detection means 114.

A DVD-ROM disc loaded on the DVD-ROM player 101 is fixed to the disc rotation means 103. Next, a focus search is carried out with a laser for CD-ROM, and the amplitude of a focus error signal is measured. As a result, the DVD-ROM disc is judged as a ROM disc because its reflectivity is relatively high. Next, the DVD-ROM disc is rotated at a predetermined speed by the disc rotation means 103, and the degree of modulation of an RF signal is measured. The measured degree of modulation is compared with a reference value, whereby the disc is judged as a DVD disc. Consequently, the disc judgement result is a DVD-ROM.

In this fourth embodiment, the DVD-ROM disc is able to perform 8×-speed playback at 4590 rpm (maximum speed), 5×-speed playback at 2870 rpm, and 2.5×-speed playback at 1435 rpm, and a low speed at which no vibration occurs is 1435 rpm. Vibration detection is carried out at 3000 rpm and 4000 rpm, and it is judged whether or not the detected vibration amounts are lower than an allowable vibration amount at the 5×-speed and the 8×-speed, respectively. Further, the allowable vibration amount is 100 μm.

Initially, the DVD-ROM disc is rotated at 1435 rpm that is a sufficiently low speed at which no vibration occurs between the disc and the reading means 104. After the traverse drive means 110 and the tracking actuator 111 are disabled, the count of the count means 115 is obtained at every rotation angle of 60 degrees. Since no vibration occurs between the disc and the reading means 104, the count due to only the eccentricity component between the disc and the reading means 104 is obtained. For example, the count may be obtained by a method of performing counting for plural rotations with one rotation as a unit, and averaging the obtained counts, or a method of performing counting for plural rotations as described above, and selecting, from the obtained counts, plural counts which are not supposed to be false counts.

For example, it is assumed that the data measured for four rotations with direction detection in each of the six-divided areas, and the average of the measured data in each area are as follows:

TABLE 1 counts at 1435 rpm

| No. | area[0] | area[1] | area[2] | area[3] | area[4] | area[5] |
|---|---|---|---|---|---|---|
| 1 | 57 | 39 | −17 | −57 | −35 | 18 |
| 2 | 59 | 39 | −20 | −55 | −35 | 18 |
| 3 | 57 | 37 | −18 | −57 | −34 | 22 |
| 4 | 57 | 39 | −18 | −59 | −33 | 14 |
| average | 57.5 | 38.5 | −18.3 | −57.0 | −34.3 | 18.0 |

Likewise, counting is carried out at 3000 rpm. When it is assumed that the counts at 3000 rpm are as follows:

TABLE 2 counts at 3000 rpm

| No. | area[0] | area[1] | area[2] | area[3] | area[4] | area[5] |
|---|---|---|---|---|---|---|
| 1 | 71 | 49 | −21 | −69 | −48 | 18 |
| 2 | 71 | 49 | −22 | −69 | −49 | 19 |
| 3 | 72 | 49 | −22 | −69 | −49 | 18 |
| 4 | 72 | 51 | −20 | −71 | −50 | 18 |
| average | 71.5 | 49.5 | −21.25 | −69.5 | −49 | 18.25 | a difference between the average values of the track counts obtained at 1435 rpm and 3000 rpm in each area is represented by

TABLE 3 counts at 3000 rpm−1435 rpm

| DAT[0] | DAT[1] | DAT[2] | DAT[3] | DAT[4] | DAT[5] |
|---|---|---|---|---|---|
| 14.0 | 11.0 | −3.0 | −12.5 | −14.8 | 0.3 | and, these counts are track counts due to vibration.

In order to obtain the vibration amount from the data shown in (Table 3), these data are substituted into (Formula 12) and (Formula 13), whereby 12 pieces of data are obtained as follows:

TABLE 4 calculated vibration amounts (3000 rpm−1435 rpm)

| vibration amount 1[0] | vibration amount 1[1] | vibration amount 1[2] | vibration amount 1[3] | vibration amount 1[4] | vibration amount 1[5] |
|---|---|---|---|---|---|
| 44 | 44 | 39 | 48 | 52 | 48 |
| 44 | 41 | 57 | 43 | 50 | 39 |

By averaging these 12 pieces of data, the vibration amount is obtained as follows.

vibration amount=46 tracks

Further, since this disc is a DVD-ROM disc, the vibration amount is multiplied by the track pitch of 0.74 μm, whereby the vibration amplitude is obtained as follows.

vibration amplitude=34.04 μm]

Since the allowable maximum vibration amount of the system is 100 μm and the obtained vibration amplitude is lower than the allowable value, the disc can be rotated at the 5×-speed, i.e., 2870 rpm.

Next, counting is carried out at 4000 rpm. When it is assumed that the counts at 4000 rpm are as follows:

TABLE 5 counts at 4000 rpm

| No. | area[0] | area[1] | area[2] | area[3] | area[4] | area[5] |
|---|---|---|---|---|---|---|
| 1 | −61 | 86 | 133 | 53 | −78 | −132 |
| 2 | −62 | 86 | 132 | 53 | −78 | −133 |
| 3 | −61 | 85 | 132 | 56 | −78 | −133 |
| 4 | −62 | 82 | 133 | 56 | −75 | −133 |
| average | −61.5 | 84.75 | 132.5 | 54.5 | −77.25 | −132.75 | a difference between the average values of the track counts obtained at 1435 rpm and 3000 rpm in each area is represented by

TABLE 6 counts at 4000 rpm−1435 rpm

| DAT[0] | DAT[1] | DAT[2] | DAT[3] | DAT[4] | DAT[5] |
|---|---|---|---|---|---|
| −119.0 | 46.3 | 150.8 | 111.5 | −43.0 | −150.8 | and, these counts are track counts due to vibration.

In order to obtain the vibration amount from the data shown in (Table 6), these data are substituted into (Formula 12) and (Formula 13), whereby 12 pieces of data are obtained as follows:

TABLE 7 calculated vibration amounts (4000 rpm−1435 rpm)

| vibration amount 1[0] | vibration amount 1[1] | vibration amount 1[2] | vibration amount 1[3] | vibration amount 1[4] | vibration amount 1[5] |
|---|---|---|---|---|---|
| 171 | 154 | 156 | 159 | 155 | 159 |
| 159 | 162 | 155 | 156 | 168 | 154 |

By averaging these 12 pieces of data, the vibration amount is obtained as follows.

vibration amount=159 tracks

Further, since this disc is a DVD-ROM disc, the vibration amount is multiplied by the track pitch of 0.74 μm, whereby the vibration amplitude is obtained as follows.

vibration amplitude=117.66 [μm]

Since the allowable maximum vibration amount of the system is 100 μm and the obtained vibration amplitude is higher than the allowable value, the disc cannot be rotated at the 8×-speed, i.e., 4590 rpm, and therefore, the maximum rotation speed is set at the 5×-speed.

Hereinafter, a description will be given of the reason why the vibration amount, the vibration speed, and the vibration acceleration can be expressed by (Formula 12)-(Formula 17), using the signed counts obtained with direction detection.

When the track count area is divided into six sections at every 60 degrees and counting is carried out for each section, the count in each section is represented by (Formula 29), assuming that the respective sections are 0–5, the vibration amount is Tc, and the phase angle of the track displacement amount at a starting point in section 0 is φ.

$$DAT[n] = T_c \cos(30n+\phi) - T_c \cos(30n+\phi-60) \quad \text{(Formula 29)}$$

When the data in the respective sections 0~5 are DAT[0]=a, DAT[1]=b, DAT[2]=c, DAT[3]=−a, DAT[4]=−b, DAT[5]=−c, from (Formula 29), DAT[0] is represented by $$DAT[0] = T_c(\cos(\phi) - \cos(\phi - 60)) \quad \text{(Formula 30)}$$

$$= T_c(\cos(\phi) - \cos(\phi)\cos(60) + \sin(\phi)\sin(60))$$

$$= T_c\left(\frac{1}{2}\cos(\phi) + \frac{\sqrt{3}}{2}\sin(\phi)\right)$$

$$= T_c \sin(\phi + \alpha_1)$$

Since $\sin(\alpha_1) = \frac{\sqrt{3}}{2}$, $\cos(\alpha_1) = \frac{1}{2}$, $$\alpha_1 = 60$$

$$\therefore DAT[0] = T_c \sin(\phi + 60)$$

$$= a$$

Likewise, DAT[1] is represented by $$DAT[1] = T_c(\cos(\phi + 60) - \cos(\phi)) \quad \text{(Formula 31)}$$

$$= T_c(\cos(\phi)\cos(60) - \sin(\phi)\sin(60) - \cos(\phi))$$

$$= T_c\left(\frac{1}{2}\cos(\phi) - \frac{\sqrt{3}}{2}\sin(\phi)\right)$$

$$= T_c \sin(\phi + \alpha_2)$$

Since $\sin(\alpha_2) = -\frac{\sqrt{3}}{2}$, $\cos(\alpha_2) = \frac{1}{2}$, $$\alpha_2 = -60$$

$$\therefore DAT[1] = T_c \sin(\phi - 60)$$

$$= b$$

From (Formula 30), $$\sin(\phi + 60) = \frac{a}{T_c} \quad \text{(Formula 32)}$$

Then, (Formula 31) is represented by $$DAT[1] = T_c \sin(\phi + 60 - 120) \quad \text{(Formula 33)}$$

$$= T_c(\sin(\phi + 60)\cos(-120) +$$

-continued $$\sin(-120)\cos(\phi + 60))$$

$$= T_c\left(-\frac{1}{2}\sin(\phi + 60) - \frac{\sqrt{3}}{2}\cos(\phi + 60)\right)$$

$$= T_c\left(\begin{array}{c} -\frac{1}{2}\sin(\phi + 60) \mp \\ \frac{\sqrt{3}}{2}\sqrt{1 - \sin^2(\phi + 60)} \end{array}\right)$$

$$= T_c\left(-\frac{1}{2}\frac{a}{T_c} \mp \frac{\sqrt{3}}{2}\sqrt{1 - \left(\frac{a}{T_c}\right)^2}\right) = b$$

Accordingly, $$-\frac{1}{2}a \mp \frac{\sqrt{3}}{2}\sqrt{T_c^2 - a^2} = b \quad \text{(Formula 34)}$$

$$\mp \frac{\sqrt{3}}{2}\sqrt{T_c^2 - a^2} = b + \frac{1}{2}a$$

$$\frac{3}{4}(T_c^2 - a^2) = b^2 + ab + \frac{1}{4}a$$

$$T_c = \pm \frac{2}{\sqrt{3}}\sqrt{a^2 + ab + b^2}$$

Likewise, since DAT[0]=a, DAT[2]=c, $$T_c = \pm \frac{2}{\sqrt{3}}\sqrt{a^2 - ac + c^2} \quad \text{(Formula 35)}$$

and, therefore, (Formula 12) and (Formula 13) are derived from (Formula 34) and (Formula 35).

Furthermore, the track cross due to the eccentricity or vibration is represented by a sinusoidal wave as follows, using the Tc, phase angle φ, and angular velocity ω.

$$f(t) = T_c \cos(\omega t + \phi) \quad \text{(Formula 36)}$$

Then, the absolute value of the track cross speed is obtained by differentiating (Formula 36) as follows.

$$\left|\frac{df(t)}{dt}\right| = \omega T_c |\sin(\omega t + \phi)| \quad \text{(Formula 37)}$$

Since $w=2\pi f$, and $f=V_{rpm}/60$ (Vrpm: present rotation speed [rpm]), $$\left|\frac{df(t)}{dt}\right| = 2\pi f T_c |\sin(\omega t + \phi)| \quad \text{(Formula 38)}$$

$$= \frac{2\pi V_{rpm}}{60} T_c |\sin(\omega t + \phi)|$$

Since (Formula 38) becomes maximum when (Formula 39)

$$|\sin(\omega t + \phi)| = 1 \quad \text{(Formula 36)}$$

(Formula 14) and (Formula 15) are derived from (Formula 34) and (Formula 35), respectively.

Furthermore, the absolute value of the track cross acceleration is obtained by differentiating (Formula 38) as follows.

$$\left|\frac{d^2 f(t)}{dt^2}\right| = \left(\frac{2\pi V_{rpm}}{60}\right)^2 |\cos(\omega t + \phi)| \quad \text{(Formula 40)}$$

Since (Formula 27) becomes maximum when $$\cos(\phi t + \phi) = 1 \quad \text{(Formula 41)}$$

(Formula 16) and (Formula 17) are derived from (Formula 34) and (Formula 35), respectively.

As described above, according to the fourth embodiment of the present invention, when the vibration amplitude, vibration speed, or vibration acceleration is evaluated by considering the track pitch of the optical disc 102, it is calculated at every predetermined rotation angle and an average of the results of calculation is obtained, and a maximum rotation speed that is lower than the allowable vibration amplitude, vibration speed, or vibration acceleration of the information disc recording/playback apparatus is determined on the basis of the average. Therefore, vibration detection can be carried out more accurately as compared with the first embodiment, by using a single threshold value, independently of the type of the information disc.

While in this fourth embodiment, setting of the maximum rotation speed of the DVD-ROM disc is described, the maximum rotation speeds of other types of discs having different track pitches, such as a CD-ROM disc having a track pitch of 1.6 μm or a DVD-R3.9G disc having a track pitch of 0.8 μm, can also be obtained by judging as to whether the measured maximum vibration amount is lower than the allowable one, by using the standard track pitch of each disc and the vibration amount.

Further, while in this fourth embodiment the vibration amount is obtained on the basis of the average of 12 pieces of data, the vibration amount may be obtained by using the average of m pieces of central values selected from the 12 pieces of data which are arranged in the order of size, or by using a value in proportion to the average.

Furthermore, while in this fourth embodiment the maximum playback speed is set on the basis of the vibration amplitude, the maximum playback speed may be set by using a value in proportion to the vibration amplitude or a value in proportion to the second power of the vibration amplitude. Alternatively, the maximum playback speed may be set on the basis of the vibration speed or a value in proportion to the vibration speed or the second power of the vibration speed, by using (Formula 14) and (Formula 15) as well as the disc rotation speed. Further, the maximum playback speed may be set on the basis of the vibration acceleration speed or a value in proportion to the vibration acceleration speed or the second power of the vibration acceleration speed, using (Formula 16) and (Formula 17) as well as the disc rotation speed.

Moreover, while in this fourth embodiment the maximum playback speed is set on the basis of the data obtained for four rotations each rotation being divided into six areas, the maximum playback speed may be obtained by measuring data corresponding to continuous two or more areas.

Fifth Embodiment

Hereinafter, an information disc recording/playback apparatus and a vibration detection method for the information disc recording/playback apparatus according to a fifth embodiment of the present invention will be described taking a DVD-ROM player as an example, with reference to FIG. 4.

Figure 4:
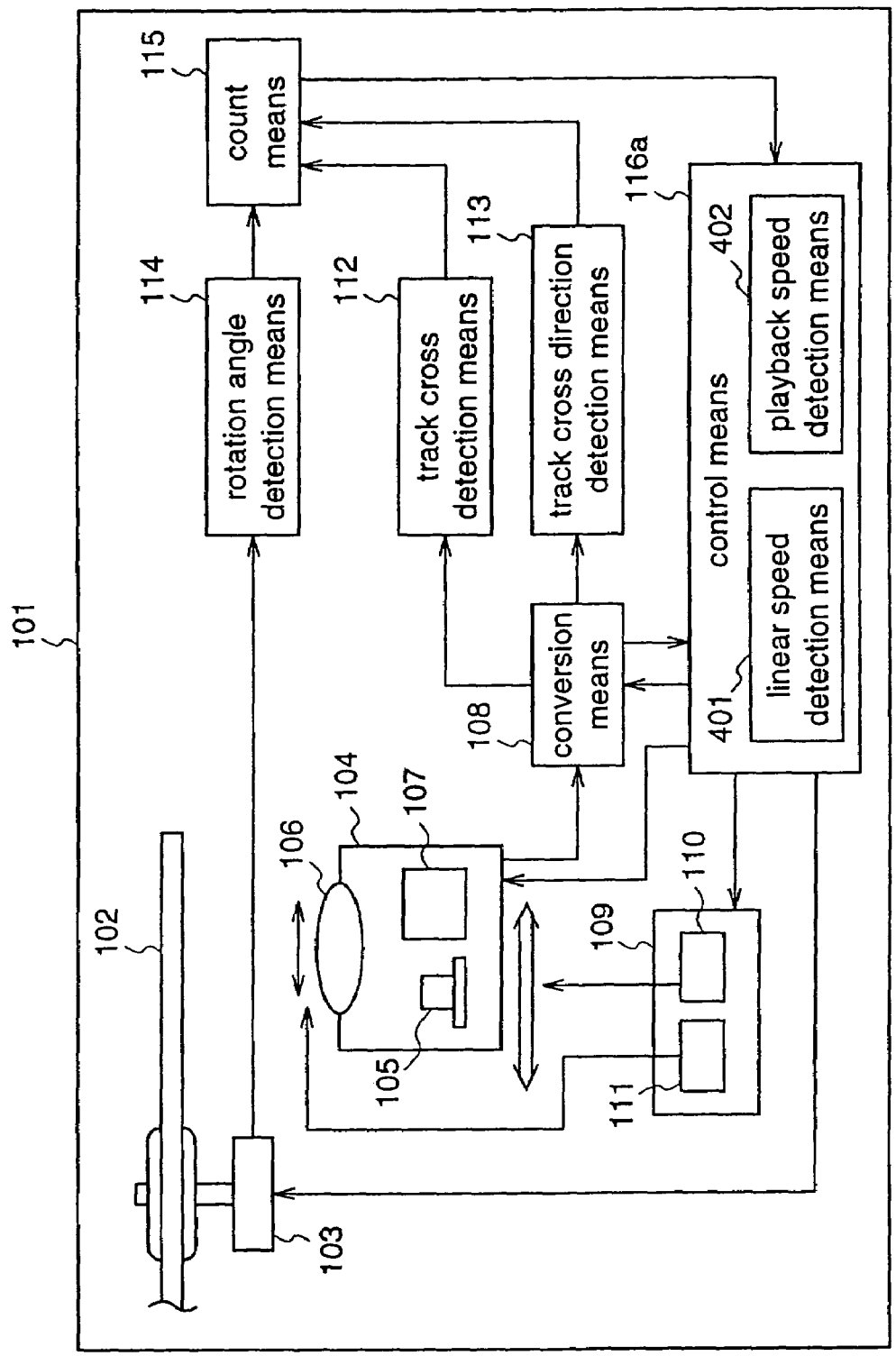
FIG. 4 is a block diagram illustrating the construction of a DVD-ROM player in the case where an information disc recording/playback apparatus and a vibration detection method for the information disc recording/playback apparatus according to a fifth embodiment of the invention are applied to the DVD-ROM player.

In FIG. 4, the same reference numerals as those shown in FIG. 1 denote the same or corresponding parts, and reference numeral 116a denotes a control means having a linear speed detection means 401 and a playback speed detection means 402. The linear speed detection means 401 detects the linear speed of the disc. For example, the linear speed is detected as follows. An address value at a certain radial position is previously read, one-track jumping is carried out, an address value at the destination of the track jumping is read, and a difference between the address values is obtained as the linear speed. Alternatively, the length of one rotation of the disc is obtained from a radial position, and the linear speed of the disc is obtained on the basis of the ratio of the length to the difference between the previously obtained address values for one rotation. The playback speed detection means 402 detects the current playback speed. For example, the current playback speed is obtained from the cycle of a PLL which generates a data playback clock, or the current playback speed is obtained on the basis of the cycle of a frame clock which is outputted for every frame of data.

Next, a description will be given of the operation for obtaining the track pitch.

Generally, assuming that the track pitch of the disc is Tp, the linear speed is V1, the current address position is Ad, the current radial position is r, the radial position at the innermost radius is R0, and the address value included in the unit time is Adunit, the following relationship holds.

$$\frac{\pi(r^2 - R_0^2)}{T_p} = \frac{V_1 Ad}{Ad_{unit}} \quad \text{(Formula 42)}$$

Further, assuming that the current rotation speed is Vrpm, the playback speed V2 at the radial position r is represented by $$V_2 = \frac{2\pi r}{V_1} \frac{V_{rpm}}{60} \quad \text{(Formula 43)}$$

Therefore, assuming that the linear speed is V1, the current address value is Ad, and the current rotation speed is Vrpm, the track pitch Tp is represented by $$T_p = \pi\left[\left(\frac{60 V_1 V_2}{2\pi V_{rpm}}\right)^2 - R_0^2\right]\frac{Ad_{unit}}{V_1 Ad} \quad \text{(Formula 44)}$$

Accordingly, the track pitch Tp can be obtained by further measuring the current playback speed V2 at a certain address Ad.

Although the address Ad at which the current playback speed V2 is obtained may be an arbitrary address, when measurement is carried out at an outer radial position, the accuracy is improved.

For example, assuming that a CD-ROM disc has linear speed V1=1.25 m/s playback speed measurement address AD=60:00:00
=270000 [frame]

rotation speed=5300 rpm playback speed=23.8× according to the standard of CD-ROM,

Adunit=75 [frame]

R0=0.0249 [m]

are obtained, and these values are substituted into (Formula 44) to obtain the track pitch as follows.

Tp=1.573 [μm]

As described above, according to the fifth embodiment, when a move distance detection means for detecting the move distance of the reading means 104 is provided, accurate vibration detection can always be carried out by measuring the accurate track pitch, even when the track pitch is different from the standard value that is set for each disc type. Furthermore, when the track pitch is obtained from the linear speed, address value, and playback speed, accurate vibration detection can always be carried out by measuring the accurate track pitch, even when the track pitch is different from the standard value that is set for each disc type, with reduced cost, without the necessity of adding a move distance detection means.

While in this fifth embodiment the track pitch of a CD-ROM disc is obtained, the track pitches of discs based on other standards, such as a DVD or a DVD-R3.9G, can be obtained in like manner as described above.

Figure 10:
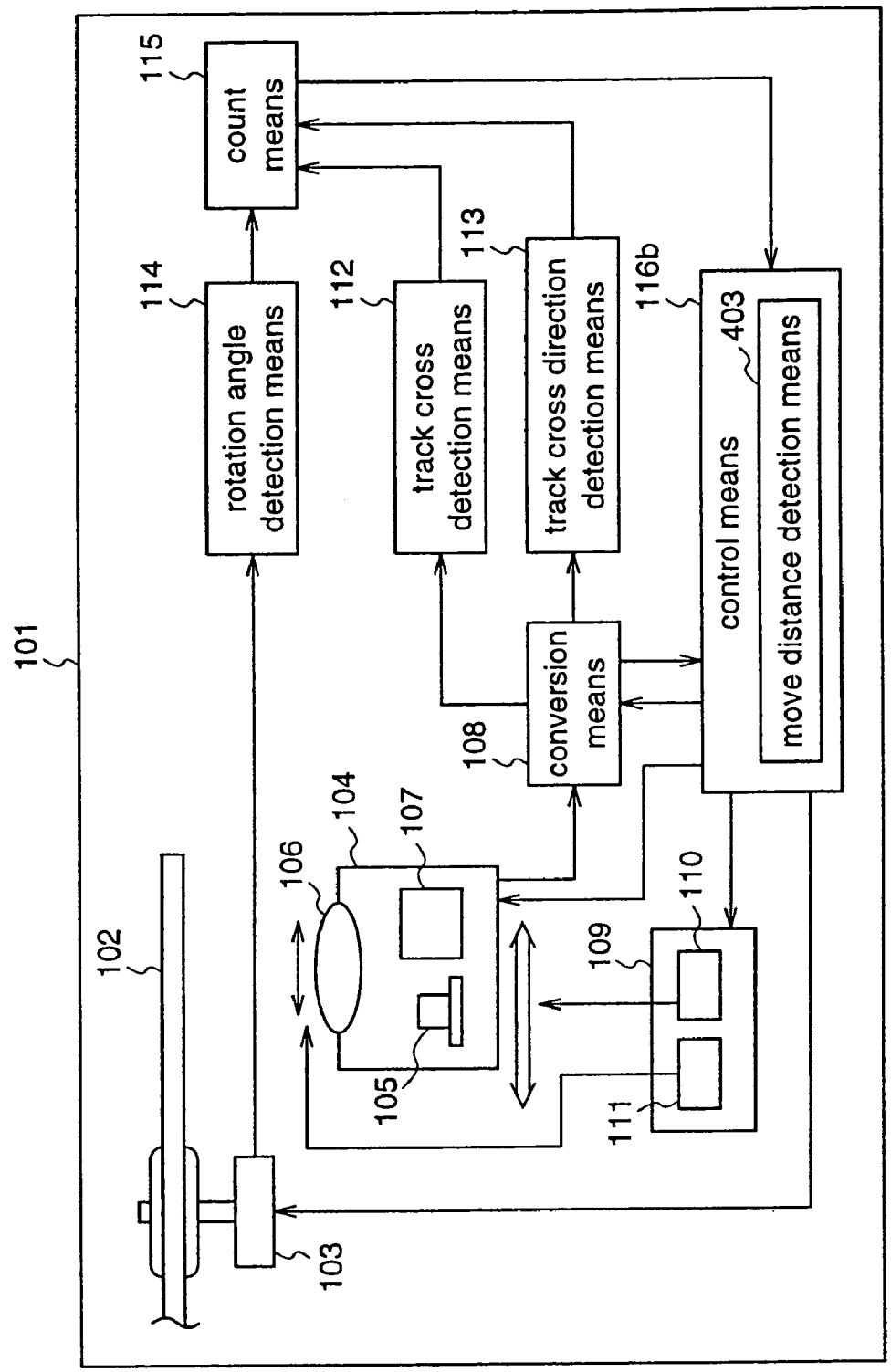
FIG. 10 is a block diagram illustrating the construction of another DVD-ROM player in the case where an information disc recording/playback apparatus and a vibration detection method for the information disc recording/playback apparatus according to the fifth embodiment of the invention are applied to the DVD-ROM player.

Further, while in this fifth embodiment the track pitch is obtained from the linear speed, address value, and playback speed, the track pitch may be obtained as follows. As shown in FIG. 10, the control means 116b is provided with a move distance detection means 403 for detecting the move distance of the reading means 104, and the reading means 104 is moved while counting the number of tracks, and the track pitch is obtained as follows.

Tp=move distance/number of crossed tracks

Sixth Embodiment

Hereinafter, an information disc recording/playback apparatus and a vibration detection method for the information disc recording/playback apparatus according to a sixth embodiment of the present invention will be described taking a DVD-ROM player as an example, with reference to FIG. 5.

Figure 5:
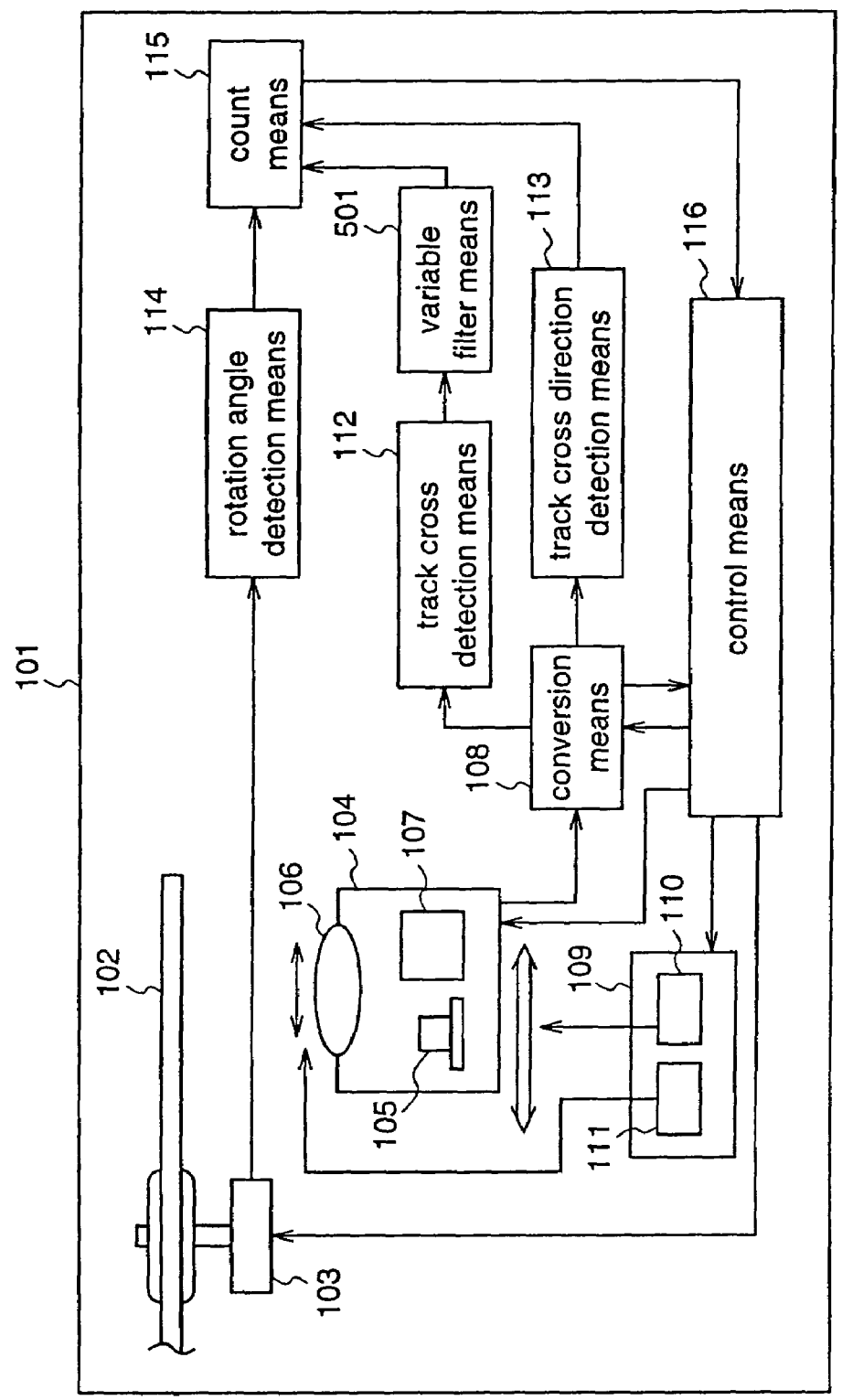
FIG. 5 is a block diagram illustrating the construction of a DVD-ROM player in the case where an information disc recording/playback apparatus and a vibration detection method for the information disc recording/playback apparatus according to a sixth, seventh, or eighth embodiment of the invention are applied to the DVD-ROM player.

In FIG. 5, the same reference numerals as those shown in FIG. 1 denote the same or corresponding parts, and reference numeral 501 denotes a variable filter means having a function of shaping the track cross pulses detected by the track cross detection means 112 so that the pulses whose widths are narrower than a predetermined value, among value such that the minimum track count pulse width corresponding to the maximum track cross speed is surely counted when an eccentricity between the disc and the turn table and a maximum vibration amplitude estimated at its rpm occur.

Assuming that the counted number of track crosses is 4Tc per rotation, the maximum track cross speed can be obtained as follows.

Initially, the track cross due to the eccentricity or vibration is expressed by a sinusoidal wave. Using the above-mentioned Tc, phase angle φ, and angular velocity ω, the track cross is represented by $$f(t) = T_c \cos(\omega t + \phi)$$ (Formula 45)

Then, the absolute value of the track cross speed is obtained by differentiating (Formula 32) as follows.

$$\left|\frac{df(t)}{dt}\right| = \omega T_c |\sin(\omega t + \phi)|$$ (Formula 46)

Since ω=2πf, and f=Vrpm/60 (Vrpm: current rotation speed [rpm]), $$\left|\frac{df(t)}{dt}\right| = 2\pi f T_c |\sin(\omega t + \phi)|$$ (Formula 47)

$$= \frac{2\pi V_{rpm}}{60} T_c |\sin(\omega t + \phi)|$$

Accordingly, the maximum track cross speed is represented by $$\text{maximum track cross speed} = \frac{2\pi V_{rpm}}{60} T_c$$ (Formula 48)

and, the maximum track cross speed can be obtained from the value of Tc.

The minimum track count pulse width is calculated on the basis of the maximum track cross speed. Assuming that the maximum track cross speed is Vmax[tracks/s], as two positive/negative pulses are outputted per track, the minimum track count pulse width is represented by $$\text{minimum track count pulse width} = \frac{1}{2V_{max}} [s]$$ (Formula 49)

Thereby, the minimum track count pulse-width of the variable filter means 501 is set. For example, when the total number of counted tracks per rotation at 3000 rpm is 287, the maximum track cross speed is represented as follows:

Initially, since

Tc=287/4=71.75 and, from (Formula 18),

Vmax=22.54 kHz and, therefore, the minimum track count pulse width is 22.18 μs from (Formula 49).

The variable filter means 501 is set on the basis of this value so that pulses whose widths are narrower than the minimum track count pulse obtained by the above calculation are also counted, considering variations in the duty ratio of the normal pulse width, or the like.

In this sixth embodiment, the variable filter means 501 is set so that a pulse having a width of up to 5.54 μs, which is one fourth of 22.18 μs, is counted as a track cross signal.

During high-speed driving, the duty ratio of the track count pulse might vary significantly due to an influence of vibration in the focusing direction, a reduction in the amplitude level of the detection signal for track counting, or the like. In this case, the variable filter means 501 may be set so that a pulse having a narrower width is counted if driving at a speed higher than a predetermined value is expected, while in the above example a value obtained by dividing the calculated minimum track count pulse width by a predetermined value is employed as a set value of the filter means 501.

When the track counting is performed by the method in which a signed count is outputted because a direction detection is carried out, the calculation method is somewhat different from that mentioned above. For example, in the system of outputting rotation angle information obtained by dividing one rotation into six areas, assuming that the count in each area for one rotation is DAT[n]=DAT[0],DAT[1],DAT[2],DAT[3],DAT[4],DAT[5]

(when n>5, n=n mod 6 (a remainder of n being divided by 6), the maximum track cross speed becomes as represented by (Formula 19) or (Formula 20). Thereby, data of plural maximum track cross speeds are obtained, and the minimum track count pulse width may be set similarly by using the average of these data, or the average of m pieces of central values of these data, or the like.

As described above, according to the sixth embodiment of the present invention, setting of the track cross filter by the variable filter means 501 is carried out on the basis of the track cross count and the current rpm, so that the pulses whose widths are narrower than a predetermined value are not counted. Therefore, even when the track cross speed varies significantly due to the eccentricity or vibration of the disc, track counting that is most suitable for vibration detection can be accurately carried out at all times.

Furthermore, setting of the minimum track count pulse width may be carried out only once before obtaining the track count for detecting the vibration amount at each rotation speed, or setting of the minimum track count pulse may be carried out each time the data (count) for detecting the vibration amount is obtained.

Seventh Embodiment

Hereinafter, an information disc recording/playback apparatus and a vibration detection method for the information disc recording/playback apparatus according to a seventh embodiment of the present invention will be described taking a DVD-ROM player as an example, with reference to FIGS. 5 and 6.

Usually, a general purpose microcomputer having a relatively small size is employed as a control means for computer peripheral equipment such as a DVD-ROM player. Such a microcomputer is basically adaptive to integer arithmetic only, and therefore, floating-point arithmetic or square root trigonometric function must be dealt with by software.

In the calculation formula (Formula 19) or (Formula 20) which is employed when the track counting is carried out by the method in which a signed count is outputted because direction detection is carried out as described for the sixth embodiment, it is necessary to obtain square roots, resulting in a problem that the number of program steps and the time required for arithmetic are increased in the system as described above. Therefore, in this case, assuming that DAT[n]=DAT[0],DAT[1],DAT[2],DAT[3],DAT[4],DAT[5]

(when n>5, n=n mod 6 (a remainder of n being divided by 6), and the rotation speed of the disc rotation means is Vrpm[rpm], $$4T_c = |DAT[0]| + |DAT[1]| + |DAT[2]| + |DAT[3]| + |DAT[4]| + |DAT[5]|$$ (Formula 50)

$$\text{maximum track cross speed} = \frac{2\pi V_{rpm}}{60} T_c \frac{1}{\cos\frac{\pi}{6}} = \frac{2\pi V_{rpm}}{60} T_c \frac{2}{\sqrt{3}}$$ (Formula 51)

and, therefore, the maximum track cross speed can be calculated with a reduced number of program steps and reduced arithmetic time, and the variable filter means can be set on the basis of the maximum track cross speed.

This is explained as follows with reference to FIG. 6.

FIG. 6 is a graph illustrating the amount of displacement of the count at every rotation angle, which displacement is caused by vibration or eccentricity.

Initially, the track cross due to eccentricity or vibration is expressed as a sinusoidal wave, in a similar manner as described for the sixth embodiment. Using the Tc, phase angle φ, and angular speed ω, the track cross is represented by $$\sin(\phi + 60) = \frac{a}{T_c}$$ (Formula 52)

Then, this is divided at every 60 degrees by dividing one rotation into six sections, as shown in FIG. 6. In FIG. 6, reference numeral 601 shows a waveform when φ=0, and reference numeral 602 shows a waveform when φ=30°.

For example, when φ=0, assuming that the data corresponding to 0–60°, 60–120°, 120–180°, . . . are DAT[0], DAT[1], DAT[2], . . . , respectively, the respective data are represented as follows.

$$DAT[0] = T(\cos(60) - \cos(0)) = -\frac{1}{2}T_c$$ (Formula 53)

$$DAT[1] = T_c(\cos(120) - \cos(60)) = -T_c$$

$$DAT[2] = T_c(\cos(180) - \cos(120)) = -\frac{1}{2}T_c$$

$$DAT[3] = T_c(\cos(240) - \cos(180)) = \frac{1}{2}T_c$$

$$DAT[4] = T_c(\cos(300) - \cos(240)) = T_c$$

$$DAT[5] = T_c(\cos(360) - \cos(300)) = \frac{1}{2}T_c$$

In this case, the Tc calculated from (Formula 21) becomes the same as the original value of the Tc.

However, in the case where the boundary of the areas divided at every 60 degrees as described above does not agree with the position where the track move direction is inverted (in the case of the waveform 601 when φ=0, the position 603 or 604), the Tc calculated by (Formula 21) becomes smaller than the original Tc, and the calculated maximum track cross speed also becomes lower than the original value. When the Tc takes the smallest value, the waveform and divided-area as shown by 602 are obtained when φ=−30°. At this time, the respective data are represented as follows.

$$DAT[0] = T(\cos(30) - \cos(-30)) = 0 \quad \text{(Formula 54)}$$

$$DAT[1] = T_c(\cos(90) - \cos(30)) = -\frac{\sqrt{3}}{2}T_c$$

$$DAT[2] = T_c(\cos(150) - \cos(90)) = -\frac{\sqrt{3}}{2}T_c$$

$$DAT[3] = T_c(\cos(210) - \cos(150)) = 0$$

$$DAT[4] = T_c(\cos(270) - \cos(210)) = \frac{\sqrt{3}}{2}T_c$$

$$DAT[5] = T_c(\cos(330) - \cos(270)) = \frac{\sqrt{3}}{2}T_c$$

Therefore, the Tc calculated from (Formula 21) becomes 0.866 times the original Tc. Accordingly, when the track counting is carried out by the method in which a signed count is outputted because direction detection is carried out, a value smaller than the original Tc, i.e., 0.866 times the original Tc at the worst, is calculated. Considering this effect, when calculating the maximum track cross speed on the basis of the Tc calculated from (Formula 21), (Formula 22) represents the maximum track cross speed including the expected error.

As described above, according to the seventh embodiment, the maximum track cross speed including an expected error is calculated on the basis of the signed track cross count and the current rpm, and the track cross filter is set on the basis of the maximum track cross speed. Therefore, track counting that is most suitable for vibration detection can be accurately carried out at all times, without needing to perform additional counting without signs or calculating square roots which require many program steps.

Eighth Embodiment

Hereinafter, an information disc recording/playback apparatus and a vibration detection method for the information disc recording/playback apparatus according to an eighth embodiment of the present invention will be described taking a DVD-ROM player as an example, with reference to FIG. 5. The fundamental construction is identical to that shown in FIG. 5 and, therefore, the distinctive operation of this eighth embodiment will be mainly described hereinafter.

When setting the variable filter means 501, initially, the total number of track crosses for one or more rotation is counted by the method in which the track cross direction is not detected. At this time, it is necessary to set an initial set value of the variable filter means 501, and usually, this initial value must be set at a value such that the minimum track count pulse width corresponding to the maximum track cross speed is surely counted when an eccentricity between the disc and the turn table and a maximum vibration amplitude estimated at its rpm occur.

Assuming that the counted number of track crosses is 4Tc per rotation, the maximum track cross speed is represented by (Formula 55), using the Tc, phase angle φ, and angular velocity ω.

$$\text{maximum track cross speed} = \frac{2\pi V_{rpm}}{60}T_c \quad \text{(Formula 55)}$$

On the basis of this maximum track cross speed, the minimum track count pulse width is calculated. Assuming that the maximum track cross speed is Vmax [tracks/s], since two positive/negative pulses are outputted per track, the minimum track count pulse width is represented by $$\text{minimum track count pulse width} = \frac{1}{2V_{\max}}[s] \quad \text{(Formula 56)}$$

and the minimum track count pulse width of the variable filter means 501 is set according to the above formula.

Further, setting the minimum track count pulse width is carried out each time the data (count) for performing detection of the vibration amount is obtained. When the value of the minimum track count pulse width varies by a predetermined value or more at the same rotation speed, there is a high possibility of false track counting of the previous counts because an optimum track count filter has not been set, and therefore, the value of the minimum track count pulse width is discarded, and only the counts after the change should be adopted as the counts for vibration detection.

As described above, according to the eighth embodiment, the counts obtained before the set value of the variable filter means 501 has changed by a predetermined value or more are not used because the possibility of false counting is high. Therefore, track counting that is most suitable for vibration detection can be accurately carried out at all times.

Ninth Embodiment

Hereinafter, an information disc recording/playback apparatus and a vibration detection method for the information disc recording/playback apparatus according to a ninth embodiment of the present invention will be described taking a DVD-ROM player as an example, with reference to FIG. 7.

Figure 7:
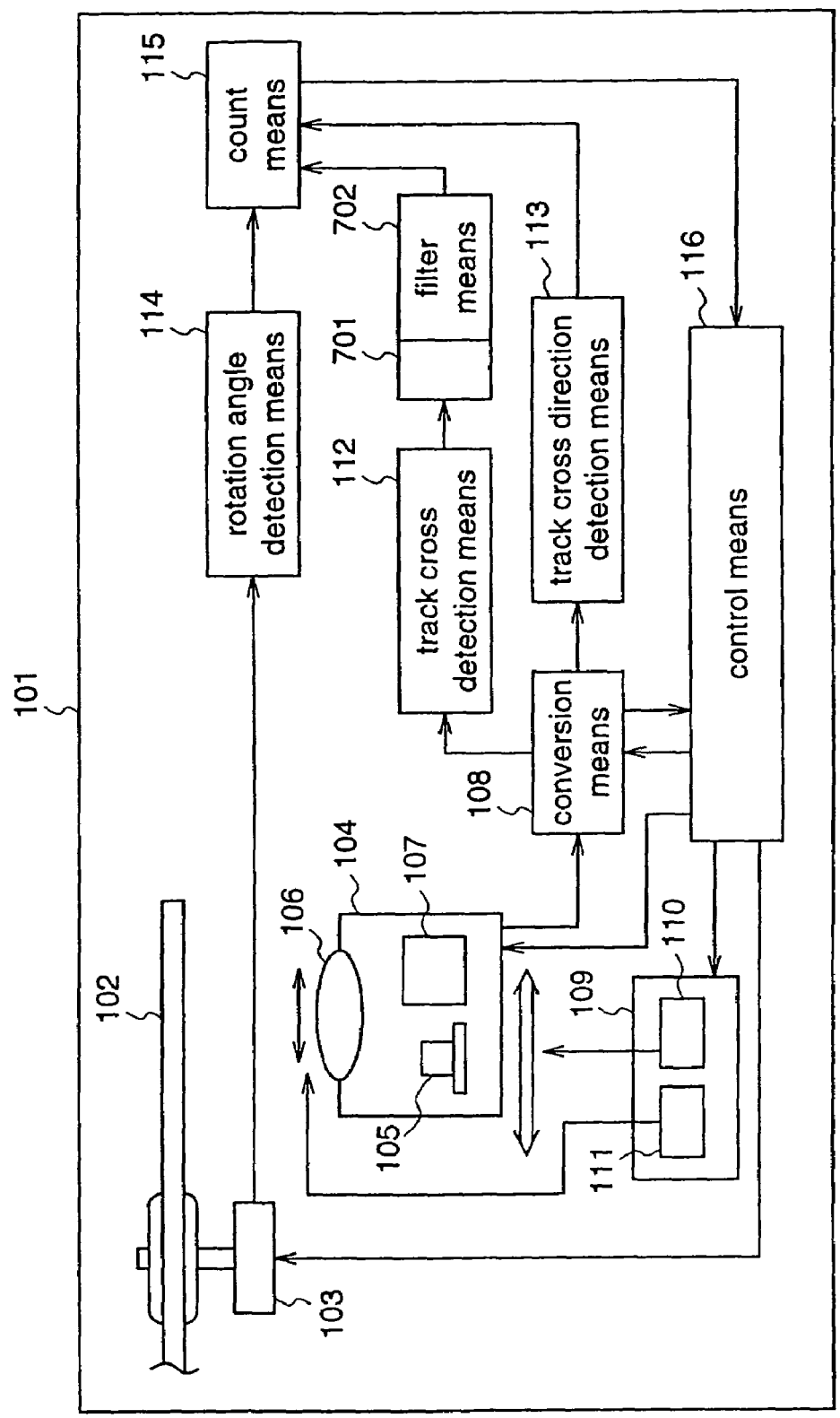
FIG. 7 is a block diagram illustrating the construction of a DVD-ROM player in the case where an information disc recording/playback apparatus and a vibration detection method for the information disc recording/playback apparatus according to a ninth embodiment of the invention are applied to the DVD-ROM player.
Figure 8:
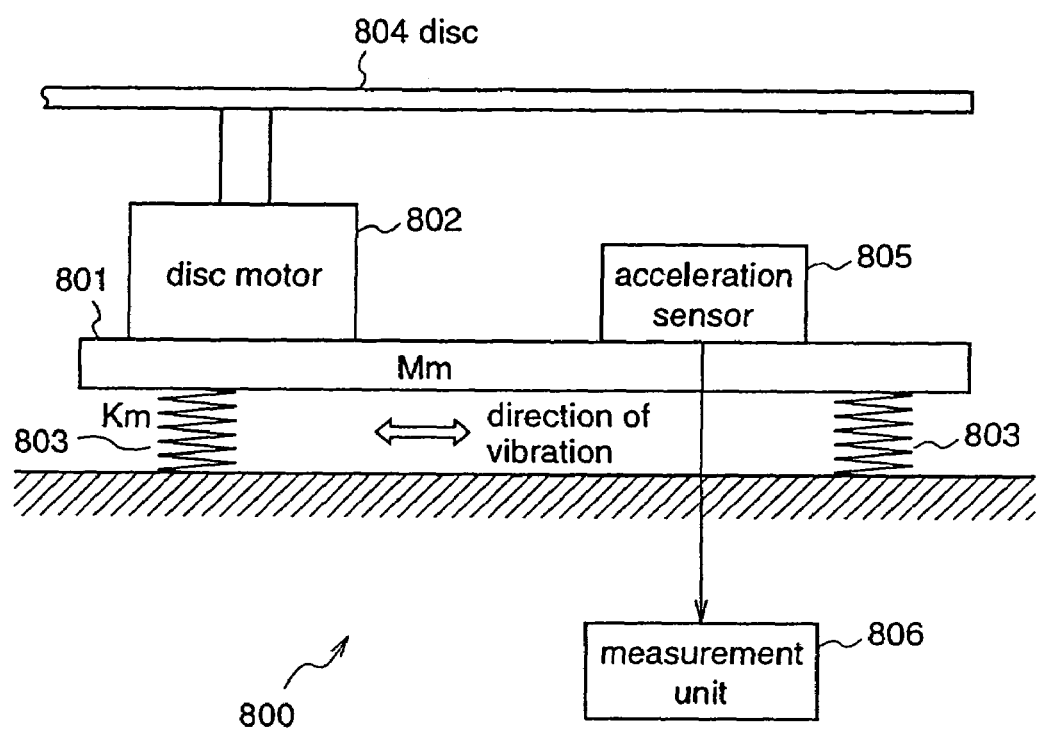
FIG. 8 is a block diagram illustrating the construction of a conventional optical disc playback apparatus which performs vibration detection using an acceleration sensor.
Figure 9:
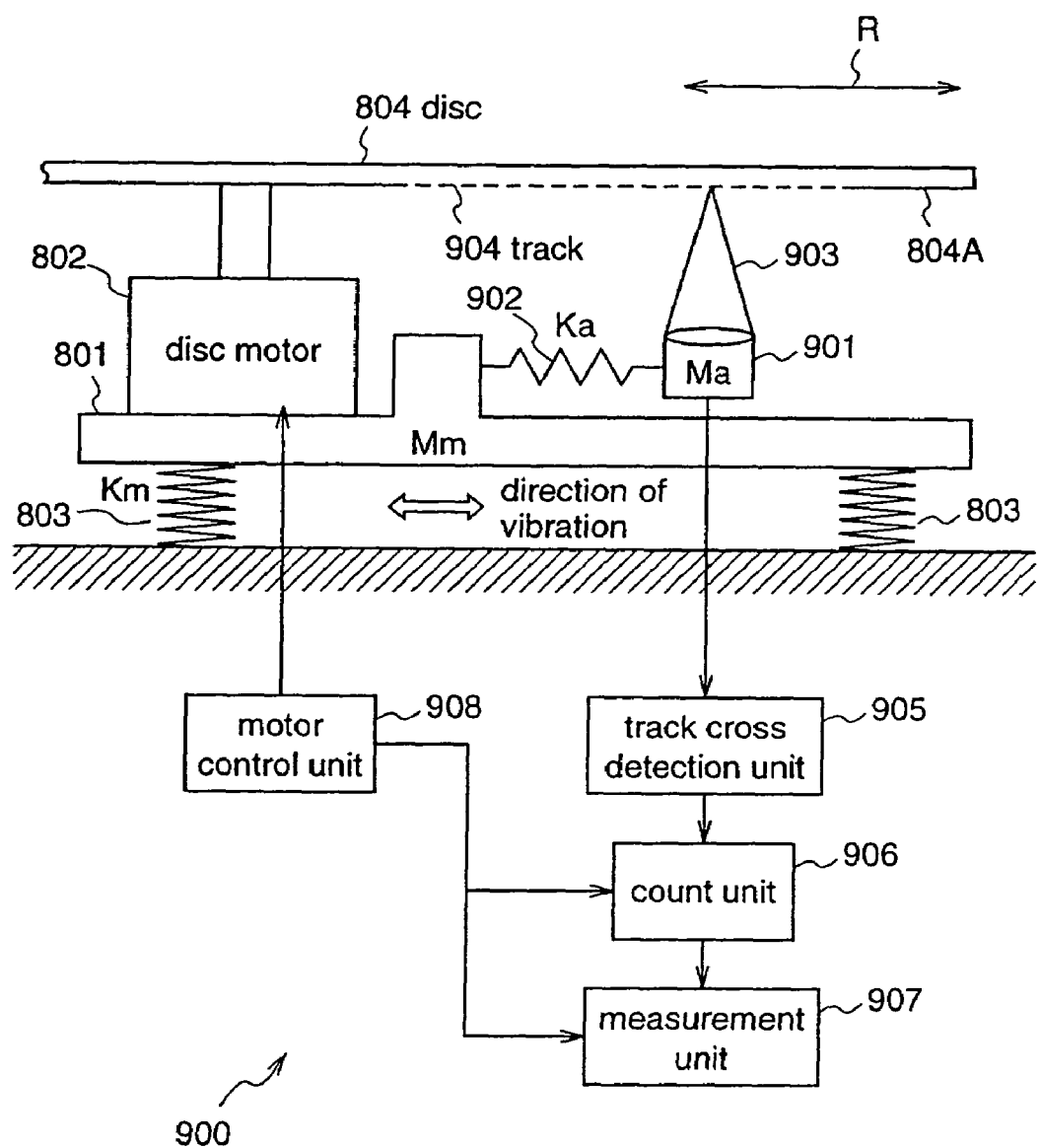
FIG. 9 is a block diagram illustrating the construction of a conventional optical disc playback apparatus which performs vibration detection using track counting.

In FIG. 7, the same reference numerals as those shown in FIG. 1 denote the same or corresponding parts, and reference numeral 701 denotes a pulse width storage means for holding the width of a pulse that is just previous to the current pulse. Reference numeral 702 denotes a filter means which receives the track cross pulse outputted from the track cross pulse detection means 112, and outputs the received track cross pulse to the count means 115. At this time, the pulse width is measured, and when the measured pulse width is a predetermined value smaller than the pulse width stored in the pulse width storage means 702, this pulse is regarded as one due to a false count and is not outputted.

As for the amount of change in the pulse width that is not counted, the measured pulse width should not be counted when it becomes smaller than the just-previous pulse width by a predetermined ratio, for example, 0.5.

As described above, according to the ninth embodiment of the present invention, the pulse width storage means 701 and the filter means 702 are provided, and when the filter means 702 judges that the measured pulse width is a predetermined value smaller than the just-previous pulse width which is stored in the pulse width storage means 701, this pulse is regarded as one due to a false detection caused by noise and is not counted by the count means 115. Therefore, track counting that is most suitable for vibration detection can be accurately carried out at all times, without requiring time for excessive measurement.

APPLICABILITY IN INDUSTRY

An information disc recording/playback apparatus and a vibration detection method for the information disc recording/playback apparatus according to the present invention are valuable as an information disc recording/playback apparatus having a vibration measurement means for measuring vibrations caused by eccentricity of a disc, and a vibration detection method for the information disc recording/playback apparatus. The apparatus and method are particularly valuable as those having a construction for detecting vibrations by using track counting.

The invention claimed is:

1. An information disc recording/playback apparatus capable of recording or playing an information disc on which information recording tracks are formed spirally or concentrically said apparatus comprising:
   a disc rotation means for rotating the information disc at a predetermined speed;
   a reading means for reading an information signal from the information disc;
   a drive means for driving said reading means in the direction of the radius of the information disc;
   a track cross detection means for generating track cross pulses on the basis of playback signals that are generated when said reading means crosses the information recording, tracks;
   a variable filter means for preventing counting of pulses whose widths are narrower than a set value, among the track cross pulses generated by said track cross detection means;
   a count means for counting the pulses outputted from said variable filter means; and
   a control means for
      determining a maximum rotation speed that is lower than an allowable number of track crosses of said information disc recording/playback apparatus on the basis of the count, or determining a maximum rotation speed that is lower than an allowable track cross speed or track cross acceleration of said information disc recording/playback apparatus on the basis of the count and the current disc rotation speed, and
      controlling said disc rotation means so that said disc rotation means rotates the information disc at a speed lower than the allowable maximum rotation speed to record or reproduce data in/from the information disc,
   wherein said control means does not use the counts obtained before a change in the value of said variable filter means if the set value of said variable filter means which is reconfigured by repetition at the same rotation speed of the information disc, is changed by a predetermined value or more when calculating the track cross count.

2. An information disc recording/playback apparatus capable of recording or playing an information disc on which information recording tracks are formed spirally or concentrically, said apparatus comprising:
   a disc rotation means for rotating the information disc at a predetermined speed;
   a reading means for reading an information signal from the information disc;
   a drive means for driving said reading means in the direction of the radius of the information disc;
   a track cross detection means for generating track cross pulses on the basis of playback signals that are generated when said reading means crosses the information recording tracks;
   a variable filter means for preventing counting of pulses whose widths are narrower than a set value, among the track cross pulses;
   a track cross direction detection means for detecting the track cross direction which indicates the direction in which said reading means crosses the information tracks;
   a rotation angle detection means for outputting rotation angle information of said disc rotation means;
   a count means including
      a first count means for counting the track cross pulses with signs, which are outputted from said variable filter means, on the basis of the result of the detection by said track cross direction detection means and the rotation angle information outputted from said rotation angle detection means, and
      a second count means for counting the track cross pulses outputted from said variable filter means, without detecting the track cross direction, on the basis of the rotation angle information outputted from said rotation angle detection means,
   wherein said count means is for
      obtaining the count of said first or second count means when an initial value of the count is set for setting an initial value of said variable filter means, a value of said variable filter means is set on the basis of the count and the current rotation speed, said drive means is disabled, and the information disc loaded on said disc rotation means is rotated at a predetermined rotation speed, and
      repeating the process of obtaining the count of said first or second count means when the value of the variable filter is set and the information disc is rotated at the predetermined speed, for a required number of times, thereby obtaining the counts for more than one rotation; and
   a control means for
      determining a maximum rotation speed that is lower than an allowable number of track crosses of said information disc recording/playback apparatus on the basis of the count, or determining a maximum rotation speed that is lower than an allowable track cross speed or track cross acceleration of said information disc recording/playback apparatus on the basis of the count and the current disc rotation speed, and
      controlling said disc rotation means so that said disc rotation means rotates the information disc at a speed lower than the allowable maximum rotation speed to record or reproduce data in/from the disc.

3. An information disc recording/playback apparatus as defined in claim 2, wherein said count means
   obtains the count of said first count means when the value of said variable filter means is set on the basis of the count and the current rotation speed, said drive means is disabled, and the information disc loaded on said disc rotation means is rotated at a predetermined rotation speed, and
   repeats the process of obtaining the count of said first count means when the information disc is rotated at the predetermined speed, for a required number of times, so as to obtain the counts for more than one rotation.

4. An information disc recording/playback apparatus as defined in claim 2, wherein when setting the value of said variable filter means on the basis of the count and the current rotation speed, if the count is obtained without detecting the track cross direction, assuming that the total number of track crosses per rotation is 4Tc, and the current rotation speed is Vrpm, a maximum track cross speed is calculated by $$\text{maximum track cross speed} = \frac{2\pi V_{rpm}}{60} T_c \quad \text{(Formula 7)}$$

and, on the basis of the calculated maximum track cross speed, the value of said variable filter means is set, and a minimum track count pulse width is set.

5. An information disc recording/playback apparatus as defined in claim 2, wherein:

said rotation angle detection means divides the rotation angle information of said disc rotation means into six areas for one rotation and outputs the divided rotation angle information; and when the count is obtained when the track cross direction is detected, the count at each of the six-divided rotation angles is represented by DAT[n]=DAT[0],DAT[1],DAT[2],DAT[3],DAT[4],DAT[5]

where n>5, n=n mod 6 (a remainder of n being divided by 6), and the rotation speed of the disc rotation means is Vrpm[rpm], a value in proportion to a maximum track cross speed 1 or a maximum track cross speed 2 are calculated as a maximum track cross speed, the maximum track cross speed 1 being represented by $$\text{maximum track cross speed } 1[n] = \frac{2\pi V_{rpm}}{60} \frac{2}{\sqrt{3}} \sqrt{|DAT[n]^2 + DAT[n]DAT[n+1] + DAT[n+1]^2|} \quad \text{(Formula 8)}$$

and the maximum track cross speed 2 being represented by $$\text{maximum track cross speed } 2[n] = \frac{2\pi V_{rpm}}{60} \frac{2}{\sqrt{3}} \sqrt{|DAT[n]^2 - DAT[n]DAT[n+2] + DAT[n+2]^2|} \quad \text{(Formula 9)}$$

and a value in proportion to an average of twelve maximum track cross speeds 1 or maximum track cross speeds 2 which are calculated for n=0–5 according to (Formula 8) and (Formula 9), respectively, or a value in proportion to an average of m pieces of central values selected from the values of the twelve maximum track cross speeds 1 or maximum track cross speeds 2, is employed as a maximum track cross speed.

6. An information disc recording/playback apparatus as defined in claim 5, wherein when the value of said variable filter means is set on the basis of the count and the current rotation speed, if the count is obtained when the track cross direction is detected, the count at each of the six-divided rotation angles is represented by DAT[n]=DAT[0],DAT[1],DAT[2],DAT[3],DAT[4],DAT[5], where n>5, n=n mod 6 (a remainder of n being divided by 6), and the rotation speed of the disc rotation means is Vrpm [rpm], a maximum track cross speed is calculated on the basis of $$4T_C = |DAT[0]| + |DAT[1]| + |DAT[2]| + |DAT[3]| + |DAT[4]| + |DAT[5]| \quad \text{(Formula 10)}$$

$$\text{maximum track cross speed} = \frac{2\pi V_{rpm}}{60} T_C \frac{1}{\cos\frac{\pi}{6}} = \frac{2\pi V_{rpm}}{60} T_C \frac{2}{\sqrt{3}} \quad \text{(Formula 11)}$$

and, on the basis of the maximum track cross speed so calculated, the value of the variable filter is set, and a minimum track count pulse width is set.

7. A method for detecting vibrations of an information disc recording/playback apparatus capable of recording or playing an information disc on which information recording tracks are formed spirally or concentrically, said method comprising:

counting track cross pulses on the basis of playback signals which are generated when the information disc fixedly loaded on the information disc recording/playback apparatus is rotated and a reading unit crosses the information tracks on the information disc, so as to obtain a count;

comparing the widths of the detected track pulses with a predetermined value, and invalidating the counts of track pulses whose widths are shorter than the predetermined value;

determining a maximum rotation speed that is lower than an allowable number of track crosses of the information disc recording/playback apparatus, on the basis of the count; and determining a maximum rotation speed that is lower than an allowable track cross speed or track cross acceleration, on the basis of the count and the current disc rotation speed.

8. A method for detecting vibrations of an information disc recording/playback apparatus capable of recording or playing an information disc on which information recording tracks are formed spirally or concentrically, said method comprising:

counting track cross pulses on the basis of playback signals which are generated when the information disc fixedly loaded on the information disc recording/playback apparatus is rotated and a reading unit crosses the information tracks on the information disc, so as to obtain a count;

detecting the track cross direction indicating the direction in which the reading unit crosses the information tracks;

outputting rotation angle information of the information disc;

comparing a set pulse width with the pulse width of the current track cross pulse, and invalidating the count of the current track cross pulse when its pulse width is decreased by a predetermined value or more;

a first count operation of counting the track cross pulses with signs, whose widths are not decreased by the predetermined value or more, on the basis of the track cross direction and the rotation angle information;

a second count operation of counting the track cross pulses whose widths are not decreased by the predetermined value or more, without detecting the track cross direction, on the basis of the rotation angle information;

setting the set pulse widths by repeating the operations of obtaining the first and second counts by a required number of times;

obtaining a count corresponding to one or more rotation of the information disc, by obtaining the counts obtained in said first and second count operations using the repeatedly set pulse widths;

determining a maximum rotation speed that is lower than an allowable number of track crosses of the information disc recording/playback apparatus, on the basis of the count; and determining a maximum rotation speed that is lower than an allowable track cross speed or track cross acceleration, on the basis of the count and the current disc rotation speed.

* * * * *